(12) United States Patent
Lepper

(10) Patent No.: US 11,592,052 B2
(45) Date of Patent: Feb. 28, 2023

(54) FASTENER ASSEMBLY WITH PIVOTING NUT

(71) Applicant: ILLINOIS TOOL WORKS INC., Glenview, IL (US)

(72) Inventor: Mark O. Lepper, Oak Park, IL (US)

(73) Assignee: Illinois Tool Works Inc., Glenview, IL (US)

(*) Notice: Subject to any disclaimer, the term of this patent is extended or adjusted under 35 U.S.C. 154(b) by 195 days.

(21) Appl. No.: 16/692,025

(22) Filed: Nov. 22, 2019

(65) Prior Publication Data

US 2020/0166069 A1 May 28, 2020

Related U.S. Application Data

(60) Provisional application No. 62/771,681, filed on Nov. 27, 2018, provisional application No. 62/771,677, filed on Nov. 27, 2018.

(51) Int. Cl.
*F16B 13/08* (2006.01)
*F16B 43/02* (2006.01)
*F16B 37/08* (2006.01)
*F16B 37/04* (2006.01)

(52) U.S. Cl.
CPC ...... *F16B 37/0814* (2013.01); *F16B 13/0808* (2013.01); *F16B 37/041* (2013.01); *F16B 43/02* (2013.01)

(58) Field of Classification Search
CPC .............................. F16B 13/0808; F16B 43/02
USPC .......................................... 411/340, 345, 537
See application file for complete search history.

(56) References Cited

U.S. PATENT DOCUMENTS

| | | | | |
|---|---|---|---|---|
| 557,361 A * | 3/1896 | Church | ............... | F16B 13/0808 411/345 |
| 788,889 A * | 5/1905 | Cutter | ................ | F16B 13/0808 411/346 |
| 1,035,399 A * | 8/1912 | Wheeler | ............ | F16B 13/0808 411/346 |
| 1,733,693 A * | 10/1929 | Porter | ................ | F16B 13/0808 411/345 |
| 1,938,153 A * | 12/1933 | Reeves | .............. | E04G 17/0658 411/537 |
| 2,933,969 A | 4/1960 | Huyssen | | |
| 3,135,154 A * | 6/1964 | Zenzic | ................ | F16B 31/028 411/12 |
| 4,431,332 A * | 2/1984 | Dieges | ................... | F16B 43/02 403/252 |

(Continued)

FOREIGN PATENT DOCUMENTS

JP S58-28919 A 6/1983
JP S59-40392 A 11/1984

(Continued)

OTHER PUBLICATIONS

Notification Communication from corresponding Japanese Patent Application No. 2019-214454 dated Jul. 8, 2021 (2 pages) (English translation included).

(Continued)

*Primary Examiner* — Flemming Saether
(74) *Attorney, Agent, or Firm* — Quarles & Brady LLP

(57) ABSTRACT

An example pivot nut assembly includes a pivot body and a nut. The nut is pivotably engaged in the pivot body.

14 Claims, 19 Drawing Sheets

(56) References Cited

U.S. PATENT DOCUMENTS

| | | | | |
|---|---|---|---|---|
| 4,830,557 | A | * | 5/1989 | Harris .................. F16B 37/044 411/112 |
| 5,738,471 | A | * | 4/1998 | Zentner ................ B60P 7/0807 410/101 |
| 6,282,857 | B1 | * | 9/2001 | Rubenacker ............ E04D 5/145 411/531 |
| 6,764,261 | B1 | * | 7/2004 | Stadler ................ E02D 29/1427 411/340 |
| 8,529,176 | B2 | * | 9/2013 | Jutila .................. F16G 11/146 410/106 |
| 8,790,059 | B2 | * | 7/2014 | Kerechanin, II ...... F16B 5/0216 411/537 |
| 2002/0071737 | A1 | | 6/2002 | Ikuta |
| 2004/0161317 | A1 | | 8/2004 | Jones et al. |
| 2008/0080948 | A1 | * | 4/2008 | Barclay De Tolly ........................ F16B 13/0808 411/340 |
| 2009/0090828 | A1 | * | 4/2009 | Junkins .................. A47G 25/10 248/220.21 |
| 2019/0368533 | A1 | * | 12/2019 | Storozuk ................ F16B 43/02 |

FOREIGN PATENT DOCUMENTS

| | | |
|---|---|---|
| JP | S60-28081 A | 7/1985 |
| JP | H1-87911 | 4/1989 |
| JP | 4590125 B2 | 12/2010 |
| WO | 2013/125998 A1 | 8/2013 |

OTHER PUBLICATIONS

Information Statement from from corresponding Japanese Patent Application No. 2019-214454 dated Jul. 8, 2021 (16 pages) (English machine translation included).

* cited by examiner

FASTENER ASSEMBLY WITH PIVOTING NUT

RELATED APPLICATIONS

This application is based on, claims priority to, and incorporates herein by reference in its entirety U.S. Provisional Application No. 62/771,677, filed on Nov. 27, 2018, and U.S. Provisional Application No. 62/771,681, filed on Nov. 27, 2018.

FIELD OF THE DISCLOSURE

Embodiments of the present disclosure generally relate to a fastening system, and, more particularly, to a fastener assembly with a pivoting nut that is configured to securely connect multiple components together.

BACKGROUND

In recent years, fasteners have been developed to secure components to one another. For example, automobiles include multiple interconnected components to form body parts, e.g., doors, hoods, trunk lids, etc.

Certain known fasteners include a threaded stud and a separate nut. The threaded stud may be secured to a first component and inserted through a second component. The nut may then be subsequently threaded onto the threaded stud and tightened against the second component to secure the first component to the second component.

However, because these known fasteners include separate threaded studs and nuts, multiple process steps are needed to secure the components. For example, to connect a first component to a second component, an operator must approach the components to one another, retrieve the stud, insert the stud, retrieve the nut, thread the nut, tighten the nut, etc. In some applications, the operator may also need to reorient the components, e.g., for when mounting a spoiler to a closed trunk lid.

Therefore, a need exists for a fastener system that is more efficient for operators to mount, assemble, and tighten.

SUMMARY

In one aspect, an example pivot nut assembly is disclosed that includes a pivot body and a nut. The nut is pivotably engaged in the pivot body.

In another aspect, an example fastener nut assembly is disclosed that includes a bolt and a pivot nut assembly. The bolt includes a threaded portion. The pivot nut assembly is threadably engaged with the threaded portion. The pivot nut assembly is moveable between an insertion-ready orientation and a torque-ready orientation.

In a further aspect, an example vehicle part is disclosed that includes a component, a threaded portion, and a pivot nut assembly. The threaded portion is connected to the component. The pivot nut assembly is threadably engaged with the threaded portion. The pivot nut assembly includes a pivot body. The pivot body is deployable between an insertion-ready orientation and a torque-ready orientation.

Figure 1:
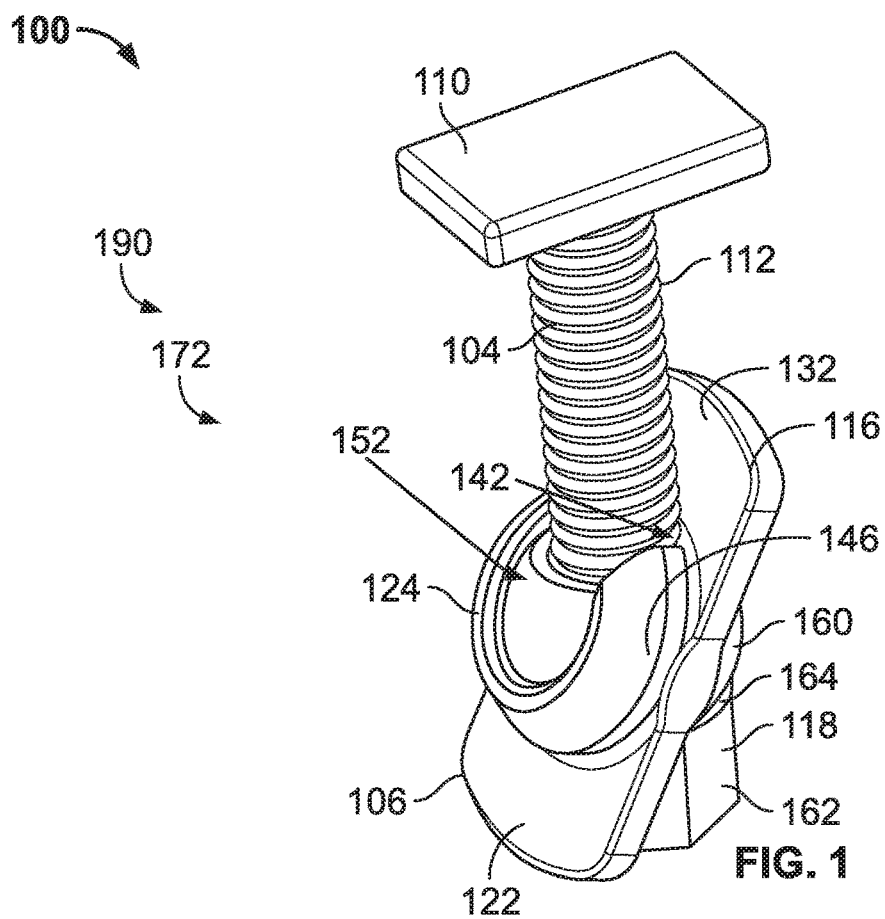
FIG. 1 is an isometric view of a first example fastener assembly according to an embodiment of the present disclosure with a pivot nut assembly of the first example fastener assembly in an insertion-ready orientation.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Embodiments of the present disclosure provide a fastener system with features that facilitate operators in mounting, assembling, and tightening the fastener system to secure components together.

A first example fastener assembly 100 according to an embodiment of the present disclosure is depicted in FIGS. 1-3 and 16-20. The first example fastener assembly 100 includes a bolt 104 and a pivot nut assembly 106. The pivot nut assembly 106 threadably engages the bolt 104, as will be explained in greater detail below.

Figure 2:
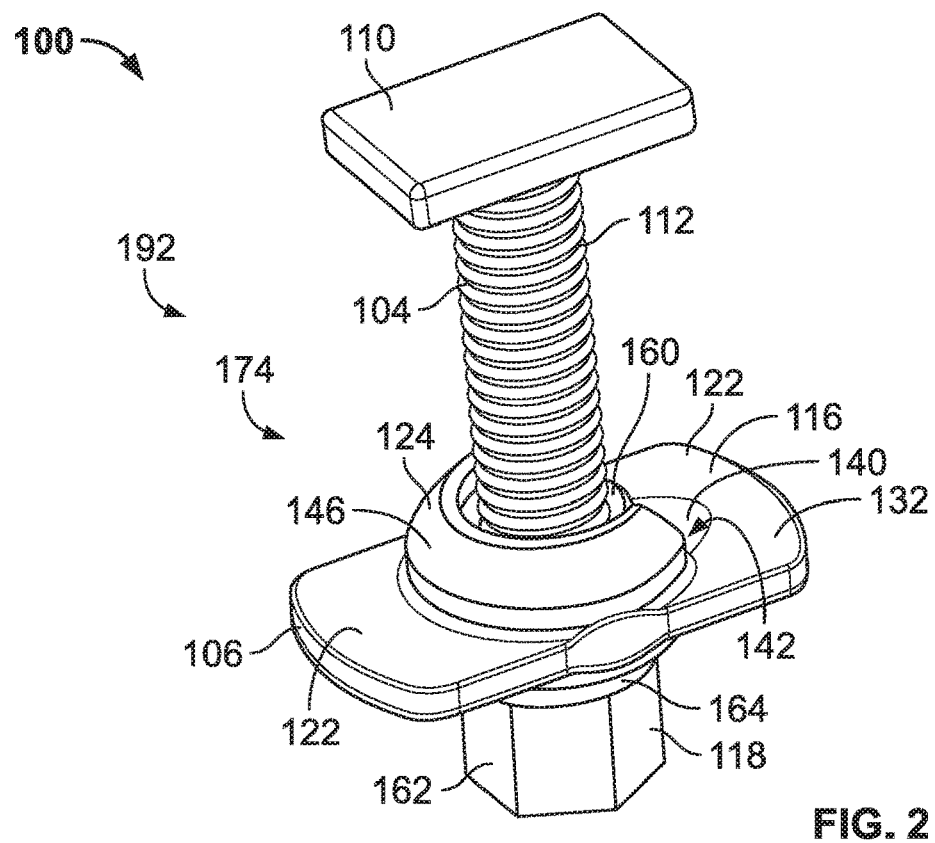
FIG. 2 is an isometric view of the first example fastener assembly of FIG. 1 with the pivot nut assembly in a torque-ready orientation.
Figure 3:
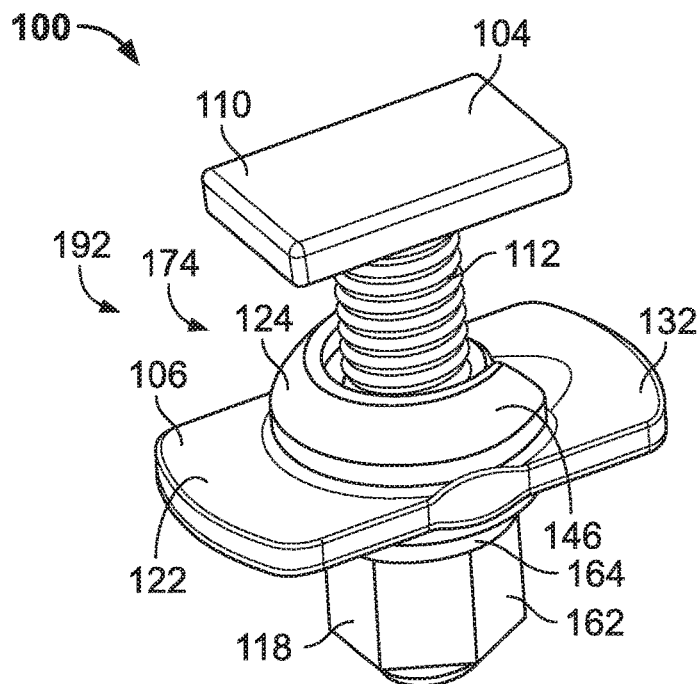
FIG. 3 is an isometric view of the first example fastener assembly of FIG. 1 with the pivot nut assembly in the torque-ready orientation of FIG. 2 and advanced along a bolt of the first example fastener assembly.

With reference to FIGS. 1-3, the bolt 104 includes a flange portion 110 and a threaded portion 112. The flange portion 110 is connected to the threaded portion 112 (e.g., welded). The flange portion 110 is non-circular (e.g., rectilinear, polygonal, ovate, ellipsoid, etc.). The threaded portion 112 is externally threaded.

With reference to FIGS. 1-3, the pivot nut assembly 106 includes a pivot body 116 and a nut 118. The nut 118 is pivotably and rotatably engaged with the pivot body 116. The nut 118 is snapably engaged with and retained in the pivot body 116. In some embodiments, the pivot body 116 is formed of polymer plastic. In some embodiments, the pivot body 116 is metallic. In some embodiments, the nut 118 is formed of polymer plastic. In some embodiments, the nut 118 is metallic.

Figure 4:
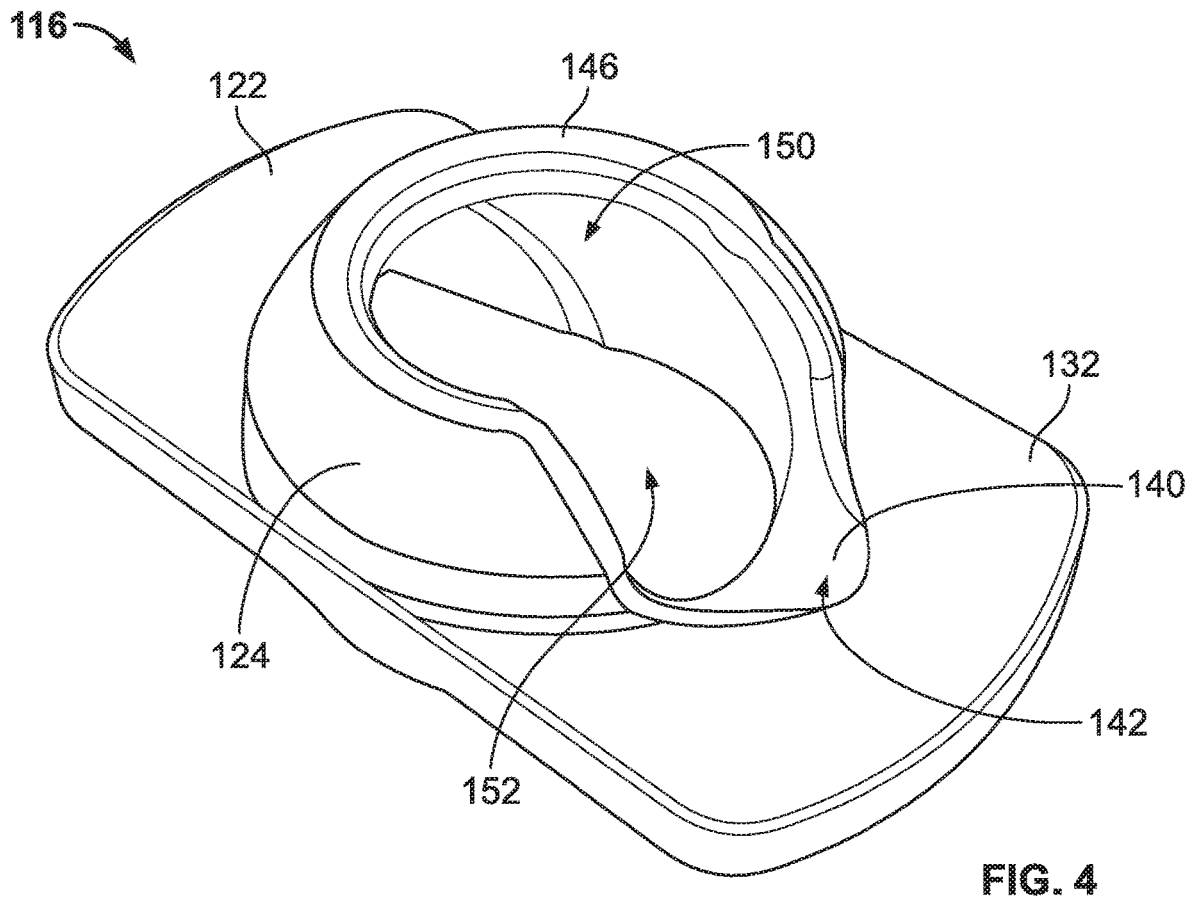
FIG. 4 is an isometric view of a pivot body of the pivot nut assembly of FIGS. 1-3.
Figure 5:
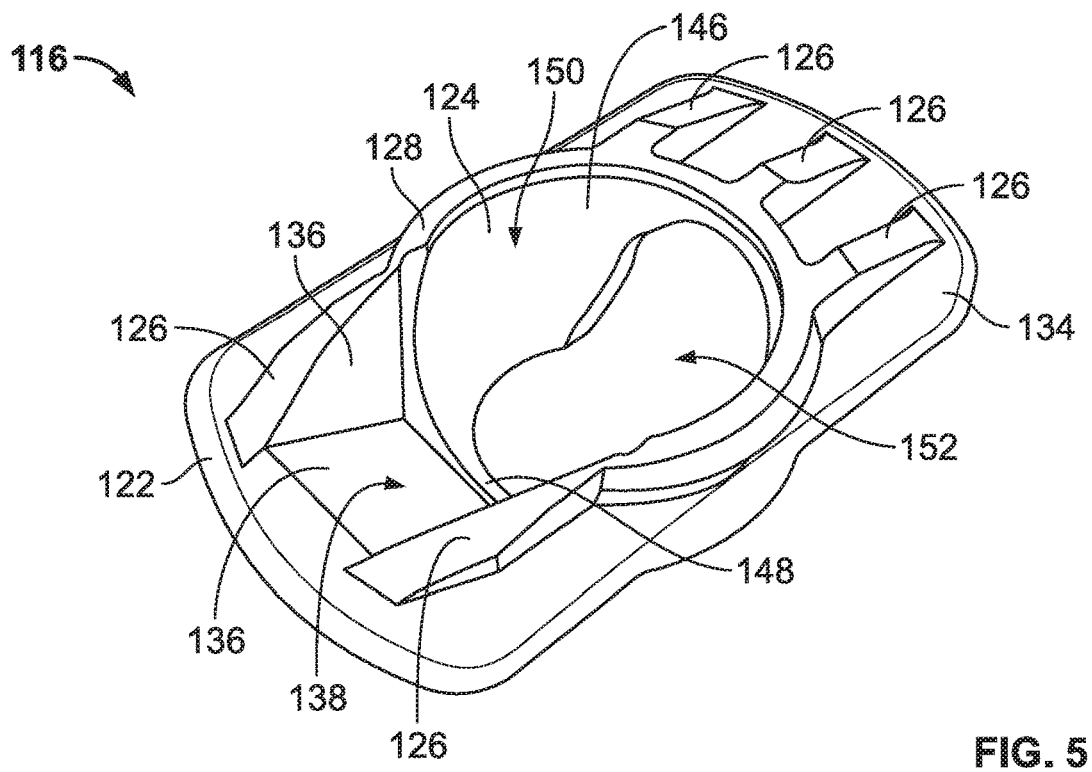
FIG. 5 is another isometric view of the pivot body of FIG. 4.
Figure 6:
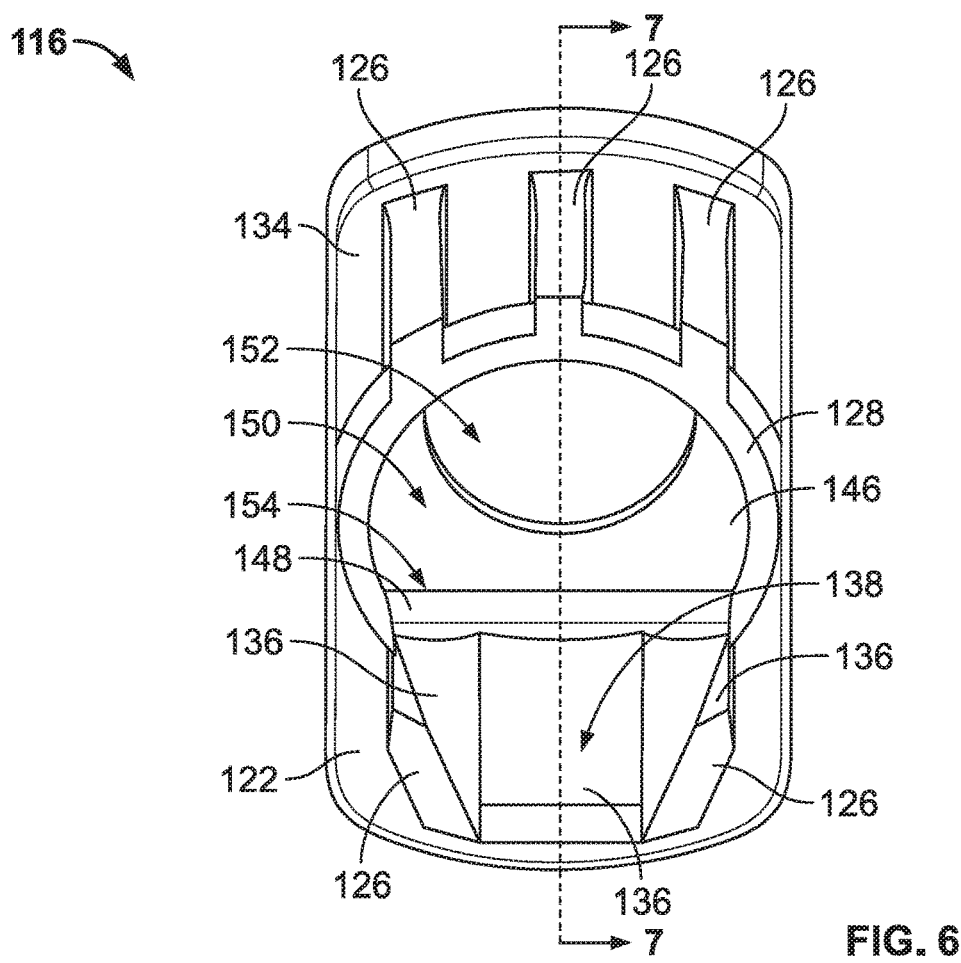
FIG. 6 is yet another isometric view of the pivot body of FIGS. 4 and 5.
Figure 7:
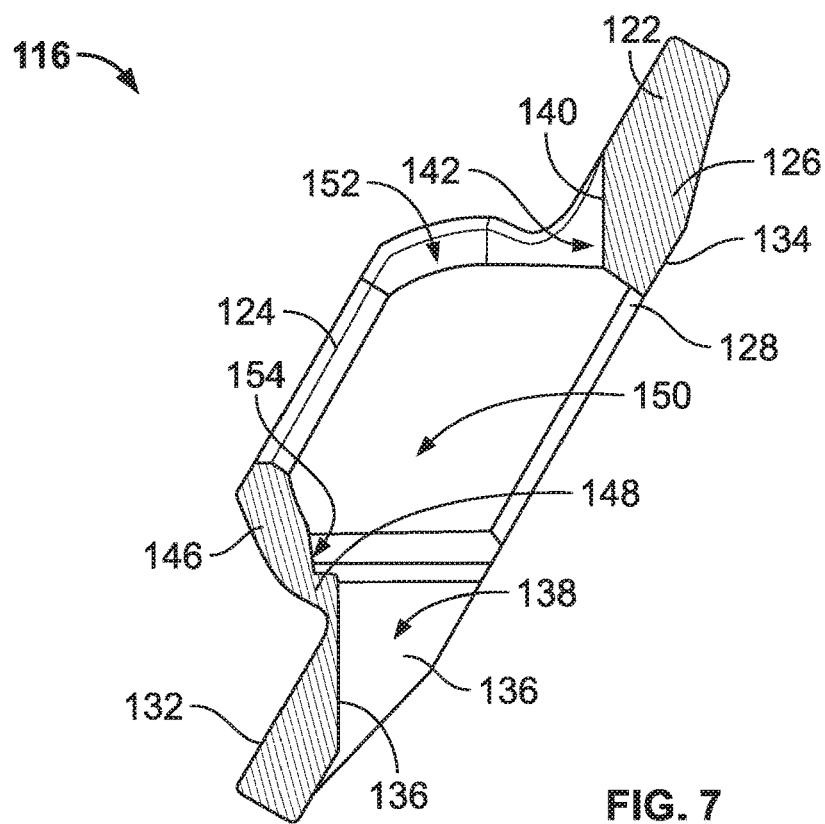
FIG. 7 is a cross-sectional view of the pivot body of FIGS. 4-6 taken along line 7-7 of FIG. 6.

With reference to FIGS. 1-7, the pivot body 116 includes a flange portion 122 and a receiver portion 124. With reference to FIGS. 5-7 the pivot body 116 also includes supporting ribs 126 and a guide lip 128. With reference to FIG. 7, the flange portion 122 has a top side 132, a bottom side 134, and nest surfaces 136. The receiver portion 124 is connected to and extends from the flange portion 122 via the top side 132. The supporting ribs 126 and the guide lip 128 are connected to and extend from the flange portion 122 via the bottom side 134. In other words the supporting ribs 126 and the guide lip 128 extend from the flange portion 122 opposite the receiver portion 124. The guide lip 128 is semicircular. In some embodiments, the guide lip 128 connects to one or more of the supporting ribs 126.

Figure 14:
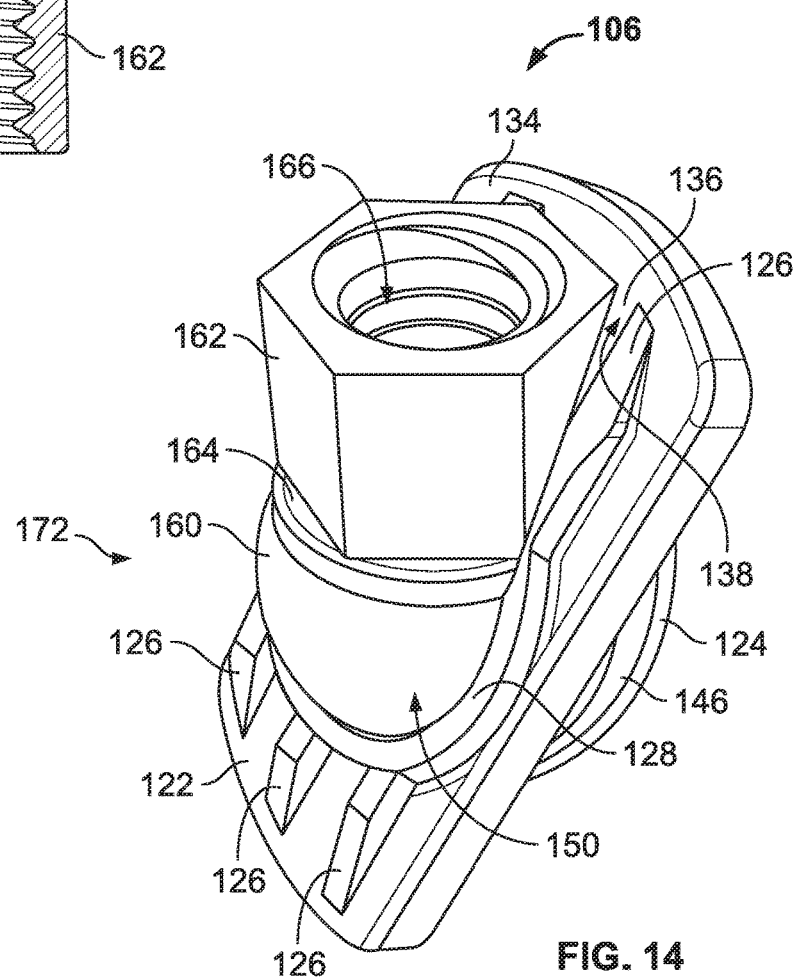
FIG. 14 is an isometric view of the pivot nut assembly of FIGS. 1-3, 12, and 13 in the insertion-ready orientation of FIGS. 1 and 2.

With reference to FIGS. 5 and 6, the nest surfaces 136 define a first pocket 138. The first pocket 138 is shaped to accommodate the nut 118 as shown in FIG. 14 and will be explained in greater detail below. In the illustrated example, the nest surfaces 136 are flat ramps. It should be understood that the nest surfaces 136 may be in any configuration to accommodate the nut 118. Additionally, with reference to FIG. 4, the flange portion 122 also includes a curved surface 140. The curved surface 140 defines a second pocket 142. The second pocket 142 is shaped to accommodate the threaded portion 112, as shown in FIG. 1.

Figure 18:
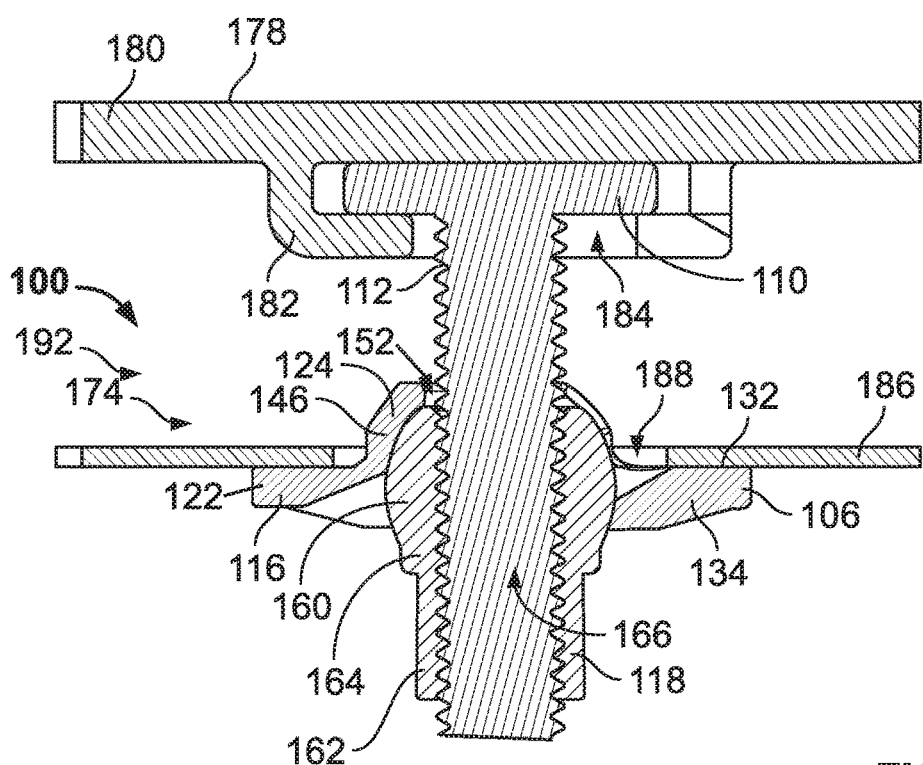
FIG. 18 is a cross-sectional view of the first example fastener assembly of FIGS. 1-3, 16, and 17 mounted to the first component of FIGS. 16 and 17 and inserted through the second component of FIGS. 16 and 17 with the pivot nut assembly of FIGS. 1-3 and 12-17 tightened against the second component.

With reference to FIGS. 4-7 the receiver portion 124 includes a socket wall 146. With reference to FIGS. 5-7, the receiver portion 124 also includes a first shoulder 148. The first shoulder 148 is connected to and extends from the socket wall 146. The socket wall 146 is partially externally spherical and partially internally spherical. Thus, the socket wall 146 defines a third pocket 150 and a first opening 152. The third pocket 150 is in communication with the first pocket 138 and the first opening 152. With reference to FIG. 4, the first opening 152 is oblong and is in communication with the second pocket 142. The first opening 152 permits the threaded portion 112 to extend through the pivot body 116, as shown in FIG. 18.

Figure 15:
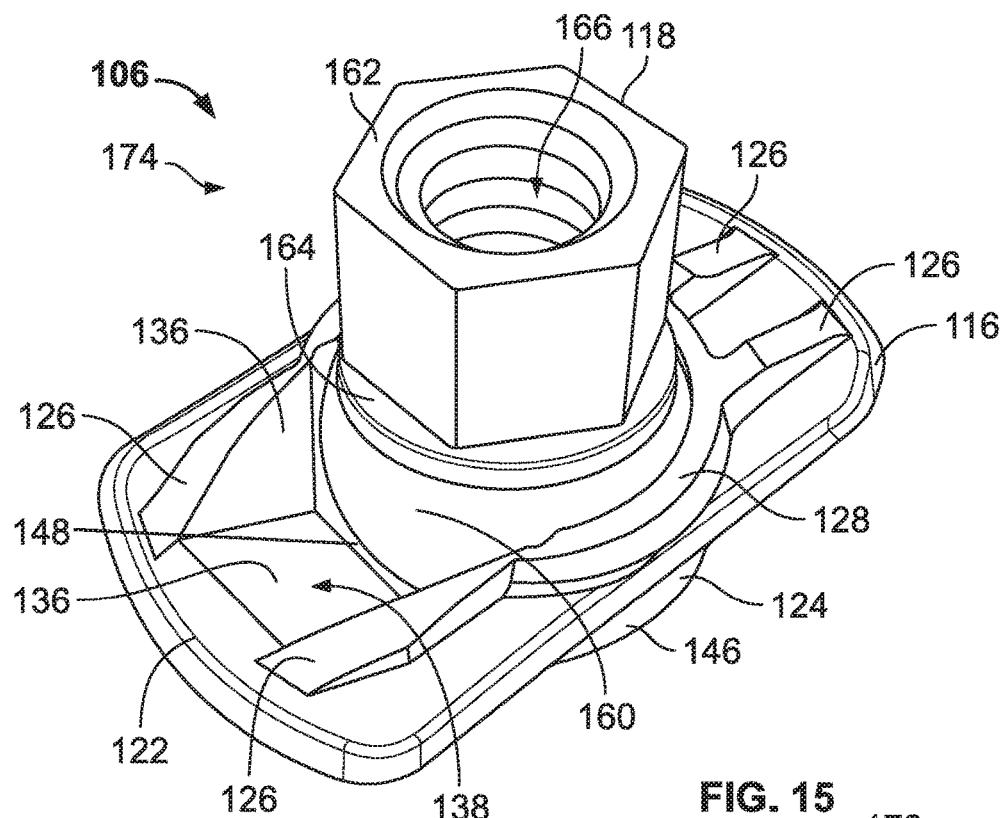
FIG. 15 is an isometric view of the pivot nut assembly of FIGS. 1-3 and 12-14 in the torque-ready orientation of FIG. 3.

With reference to FIGS. 5-7, the socket wall 146 and the first shoulder 148 define a fourth pocket 154. The fourth pocket 154 is in communication with the third pocket 150. The socket wall 146 is partially internally spherical to receive the nut 118 in the third pocket 150, as shown in FIGS. 14 and 15. The socket wall 146 thus pivotably and rotatably engages the nut 118. Further, the guide lip 128 is shaped to snapably retain the nut 118 in the third pocket 150. Additionally, the first shoulder 148 is shaped to snapably engage the nut 118, as shown in FIG. 13 and will be explained in greater detail below.

Figure 38:
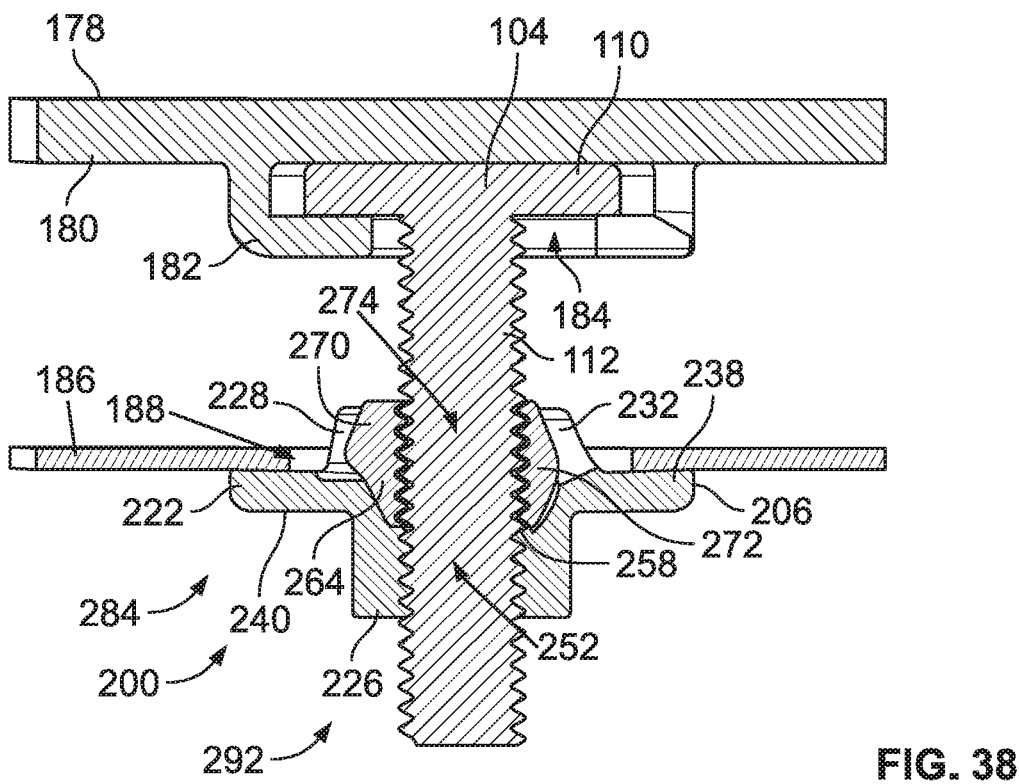
FIG. 38 is a cross-sectional view of the second example fastener assembly of FIGS. 21-23, 36, and 37 mounted to the first component of FIGS. 16-18, 36, and 37 and inserted through the second component of FIGS. 16-20, 16, and 17 with the pivot nut assembly of FIGS. 21-23 and 32-37 tightened against the second component.

With reference to FIGS. 8-11, the nut 118 includes a pivot portion 160, a drive portion 162, and a second shoulder 164. The nut 118 defines a second opening 166. In some embodiments, the nut 118 is internally threaded. With reference to FIG. 38, in some embodiments, the bolt 104 taps (e.g., cuts internal threads into) the nut 118 as the pivot nut assembly 106 is advanced along the threaded portion 112.

Figure 8:
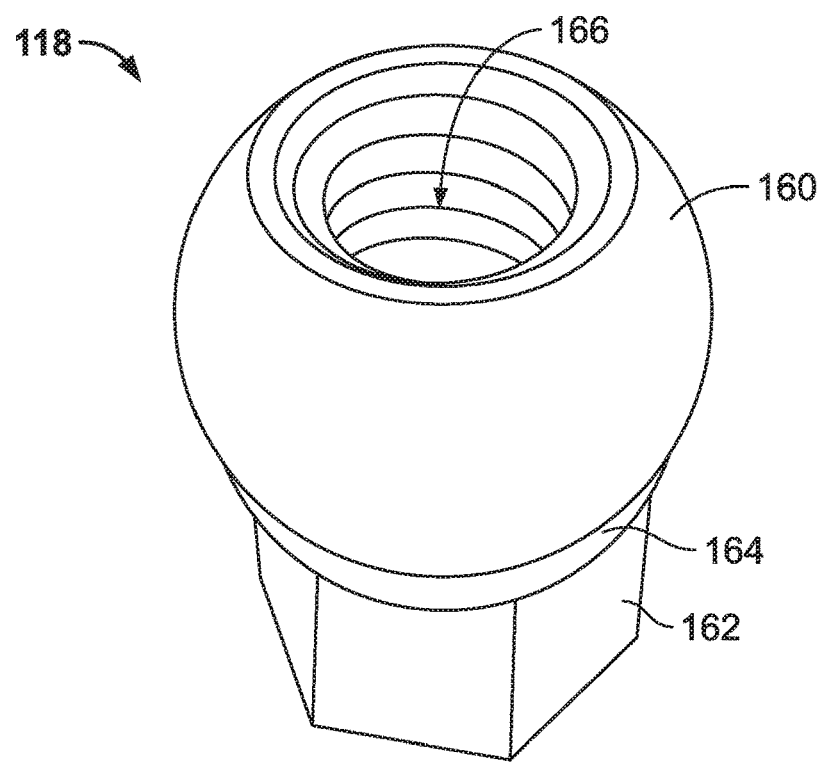
FIG. 8 is an isometric view of a nut of the pivot nut assembly of FIGS. 1-3.
Figure 9:
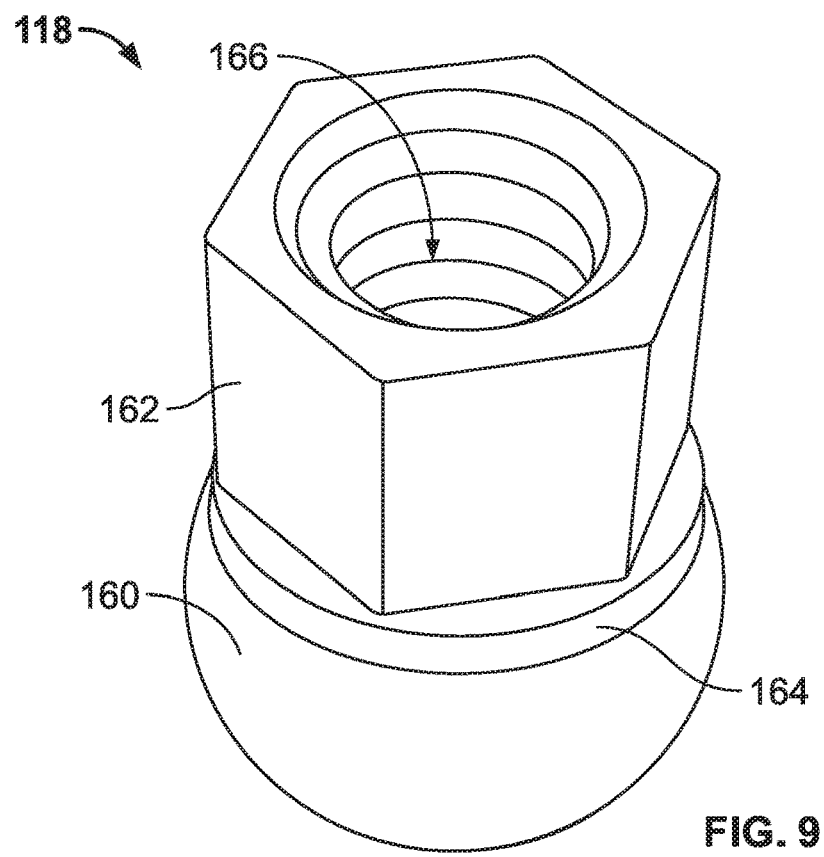
FIG. 9 is another isometric view of the nut of FIG. 8.
Figure 10:
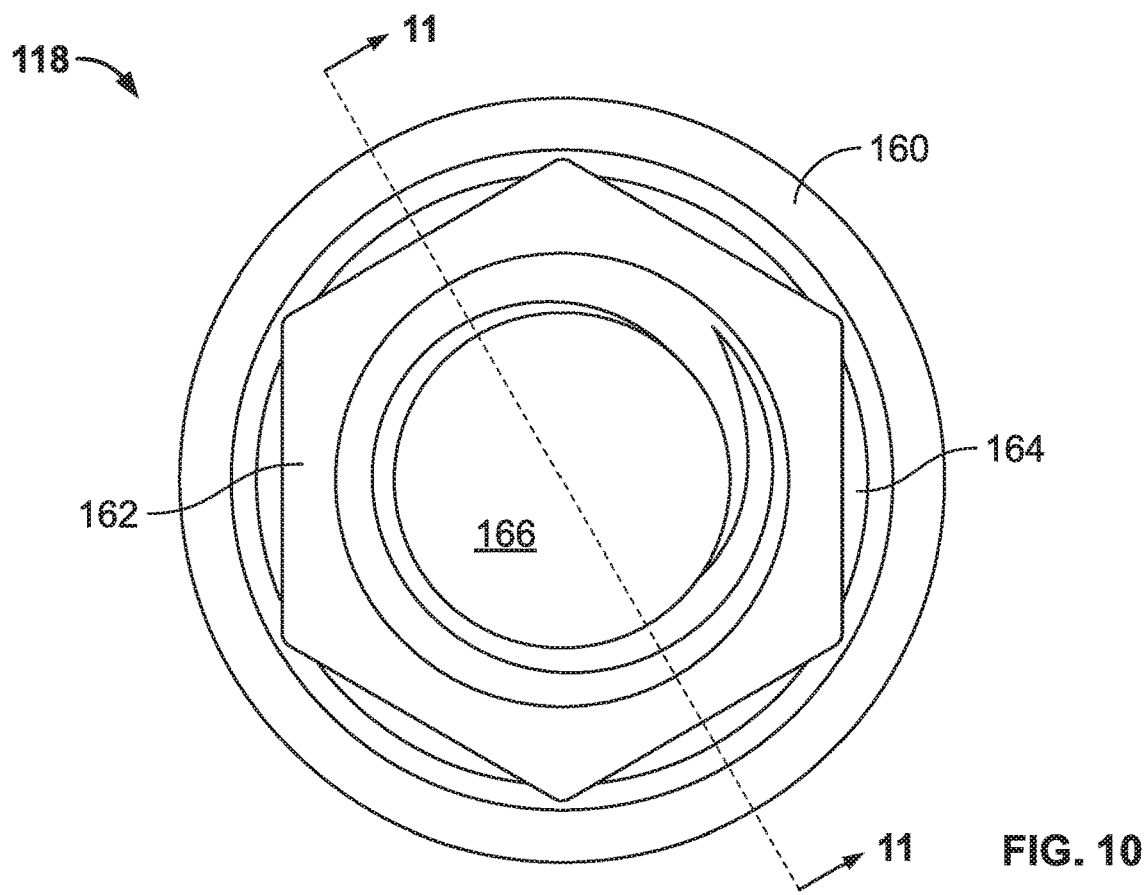
FIG. 10 is a bottom view of the nut of FIGS. 8 and 9.
Figure 11:
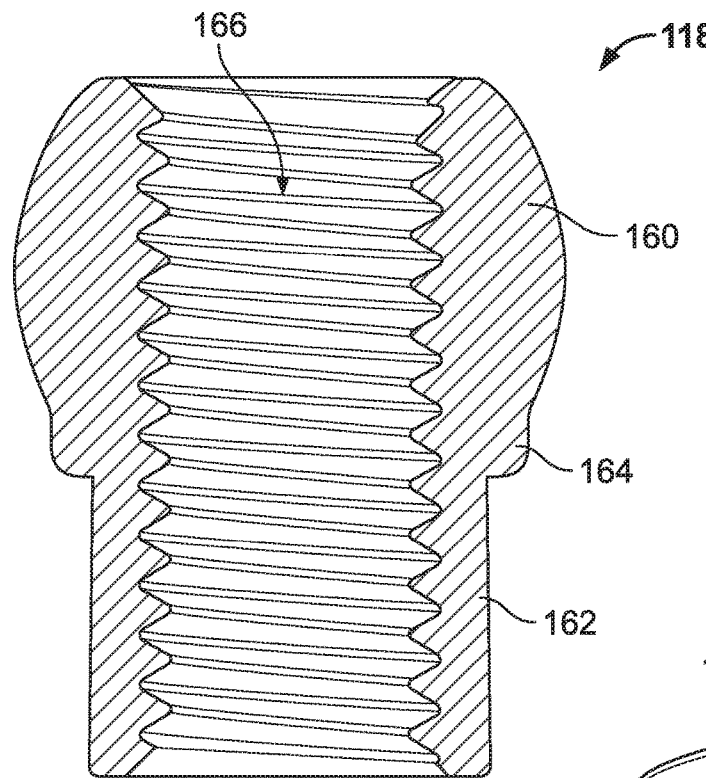
FIG. 11 is a cross-sectional view of the nut of FIGS. 8-10 taken along line 11-11 of FIG. 10.
Figure 12:
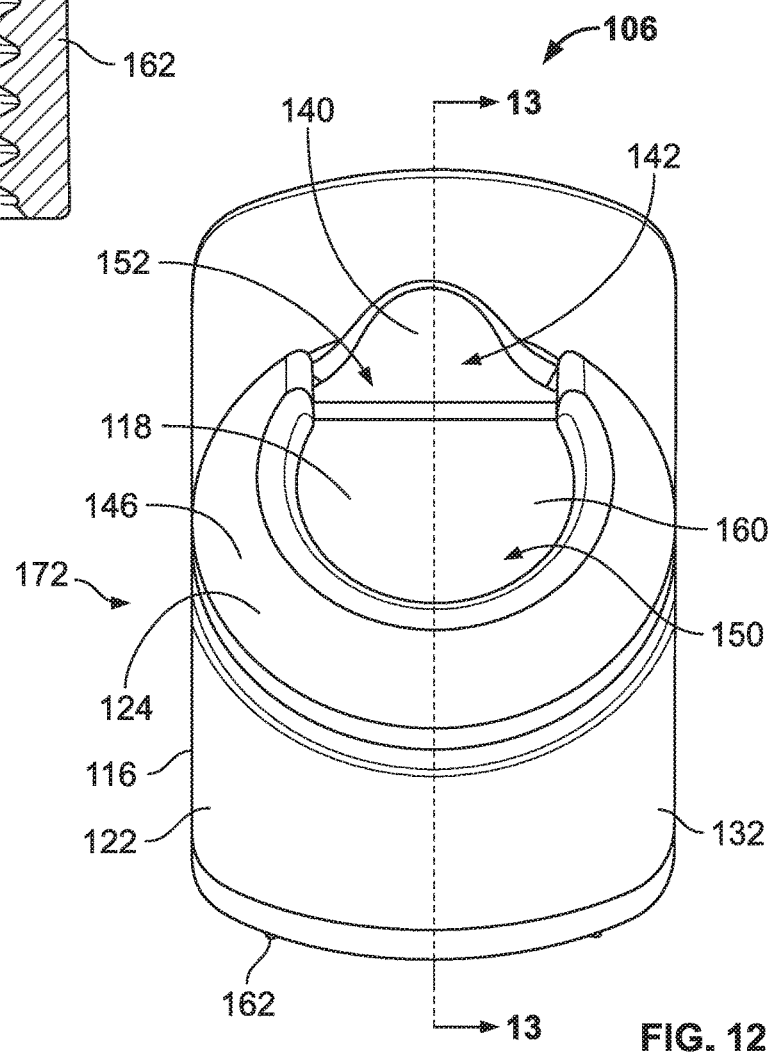
FIG. 12 is an isometric of the pivot nut assembly of FIGS. 1-3.

With reference to FIGS. 8, 9, and 11, the second shoulder 164 is connected to and extends from the pivot portion 160. The drive portion 162 is connected to and extends from the second shoulder 164. The drive portion 162 is non-circular (e.g., rectilinear, hexagonal, ovate, etc.) to correspond with a torque-applying tool (e.g., a wrench and/or a screwdriver) (not shown). In the illustrated example, the drive portion 162 is depicted as hexagonal. The pivot portion 160 is partially spherical to snapably fit into the receiver portion 124 via the third pocket 150, as shown in FIGS. 12-15. Thus, the pivot portion 160 pivotably and rotatably engages the socket wall 146.

Figure 13:
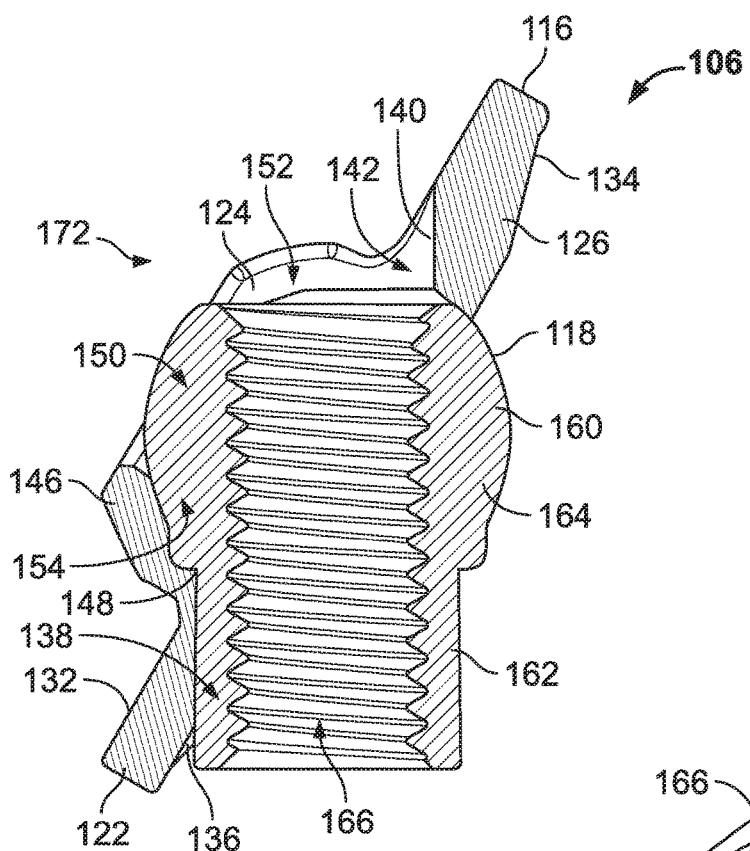
FIG. 13 is a cross-sectional view of the pivot nut assembly of FIGS. 1-3 and 12 taken along line 13-13 of FIG. 12.

With reference to FIGS. 13-15, as mentioned above, the pivot body 116 receives the nut 118. In other words, the nut 118 is pivotably and rotatably engaged in the pivot body 116. More specifically, the pivot portion 160 is snapably, pivotably, and rotatably disposed in (e.g., fits into) the third pocket 150 defined by the socket wall 146. When the pivot nut assembly 106 is assembled, the pivot portion 160 is interferingly pushed through the guide lip 128 into the third pocket 150. Thus, the guide lip 128 guides the pivot portion 160 into the third pocket 150. Further, the guide lip 128 retains the pivot portion 160 in the third pocket 150. Thus, the nut 118 is pivotably and rotatably moveable relative to the pivot body 116 between a first position 172 (shown in FIGS. 13 and 14) and a second position 174 (shown in FIG. 15). In other words, with reference to FIG. 16, when the nut 118 is in the first position 172, the pivot nut assembly 106 is in an insertion-ready orientation 190. Additionally, with reference to FIGS. 17 and 18, when the nut 118 is in the second position 174, the pivot nut assembly 106 is in a torque-ready orientation 192.

With reference to FIGS. 13 and 14, when the nut 118 is in the first position 172, the drive portion 162 nests in the first pocket 138 defined by the nest surfaces 136. Because the drive portion 162 is depicted as hexagonal in the illustrated example, the nest surfaces 136 are shaped as flat ramps and the first pocket 138 is polygonal. It should be understood that the nest surfaces 136 are shaped to correspond to any configuration of the drive portion 162. Thus, the first pocket 138 is defined to correspond to any configuration of the drive portion 162. Additionally, when the nut 118 is in the first position 172, the second opening 166 is in communication and aligned with the first opening 152.

With reference to FIG. 13, when the nut 118 is in the first position 172, the second shoulder 164 abuttingly engages the first shoulder 148 in the fourth pocket 154. Thus, the first shoulder 148 pivotably retains the nut 118 in the first position 172. Put differently, the first shoulder 148 and the second shoulder 164 selectively engage to retain the nut 118 in the first position 172 relative to the pivot body 116. In other words, when the nut 118 is in the first position 172, the second shoulder 164 is snapped into the fourth pocket 154. Additionally, when the nut 118 is in the first position 172, the second opening 166 is in communication and aligned with the first opening 152.

With reference to FIG. 15, when the nut 118 is in the second position 174, the second shoulder 164 is free of the first shoulder 148. Thus, the nut 118 is free to pivot and rotate relative to the pivot body 116. Additionally, in operation, when the nut 118 moves from the first position 172 (shown in FIGS. 13 and 14) to the second position 174, the second shoulder 164 snaps past the first shoulder 148. Further, in operation, when the nut 118 moves from the second position 174 to the first position 172 (shown in FIGS. 13 and 14), the second shoulder 164 snaps past the first shoulder 148. Additionally, when the nut 118 is in the first position 172, the second opening 166 is in communication and aligned with the first opening 152, as shown in FIG. 18.

With reference to FIGS. 1-3 and 16-18, the pivot nut assembly 106 threadably engages the bolt 104 via the nut 118. More specifically, with reference to FIGS. 16-18, the threaded portion 112 extends through the first opening 152 and into the second opening 166 to threadably engage the nut 118. It should be appreciated that because the first opening 152 is oblong, the pivot body 116 is free to pivot relative to the nut 118 even when the pivot nut assembly 106 is threaded onto the bolt 104.

Figure 16:
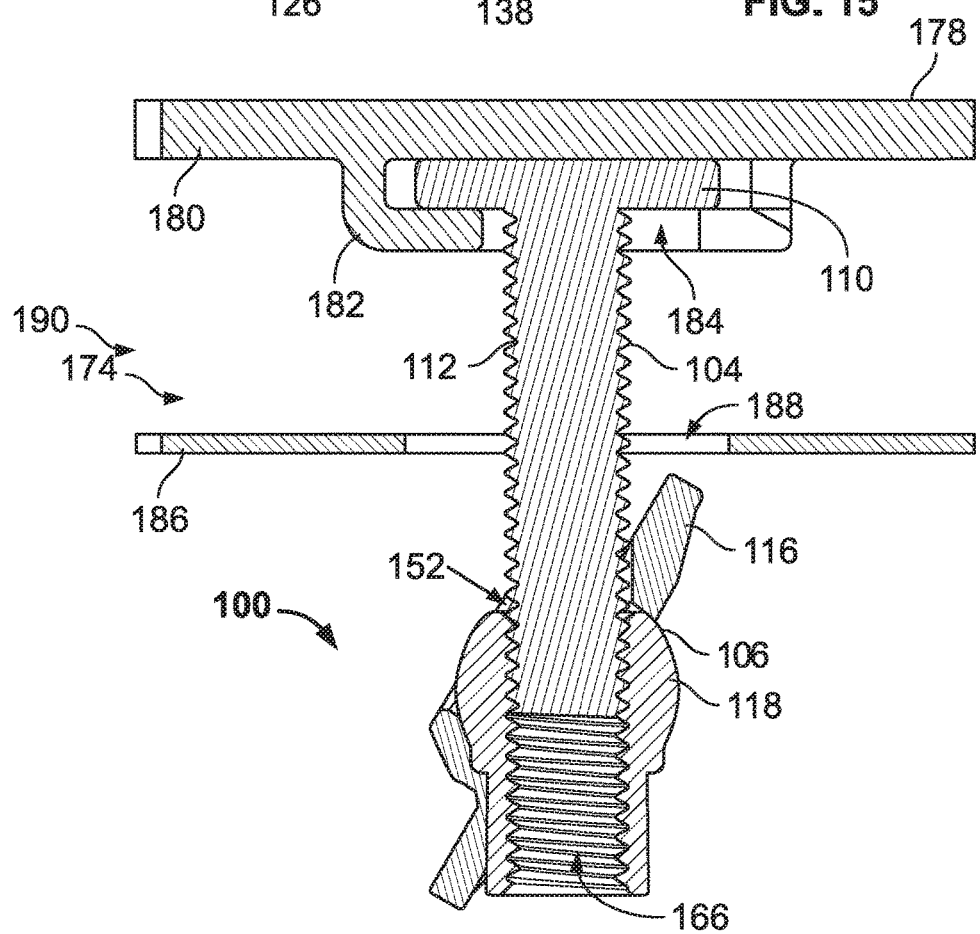
FIG. 16 is a cross-sectional view of the first example fastener assembly of FIGS. 1-3 mounted to a first component and inserted through a second component with the pivot nut assembly of FIGS. 1-3 and 12-15 in the insertion-ready orientation of FIGS. 1 and 14.
Figure 17:
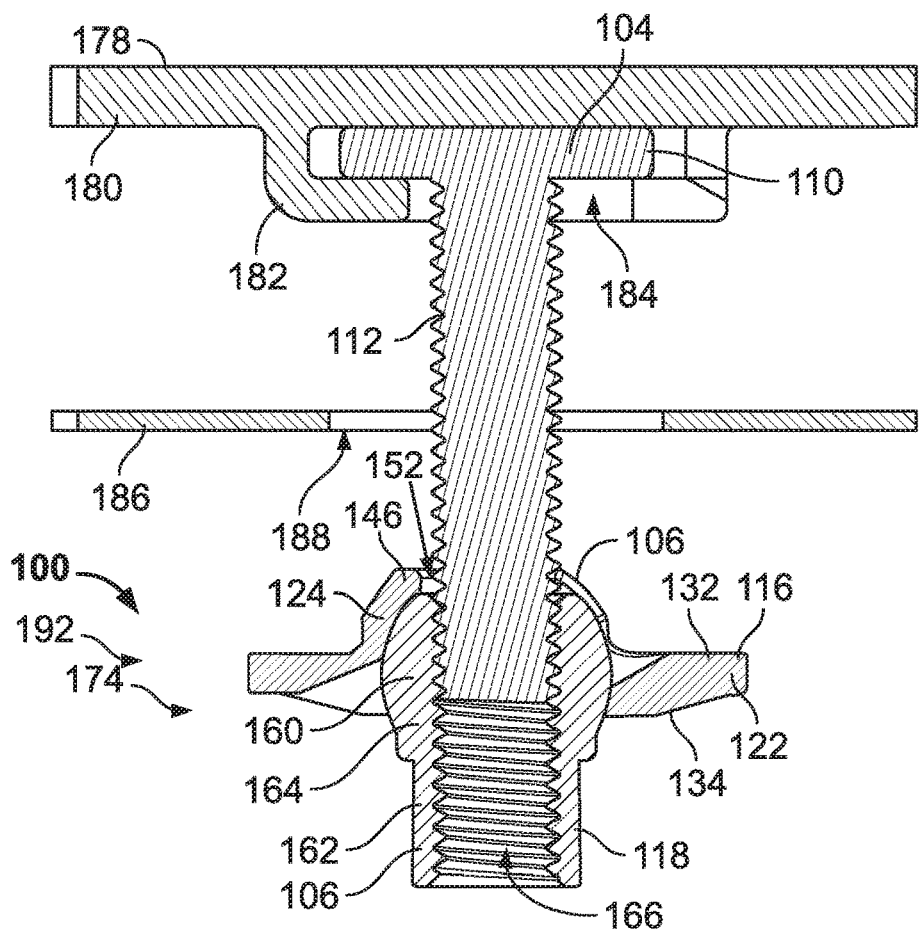
FIG. 17 is a cross-sectional view of the first example fastener assembly of FIGS. 1-3 and 16 mounted to the first component of FIG. 16 and inserted through the second component of FIG. 16 with the pivot nut assembly of FIGS. 1-3 and 12-16 in the torque-ready orientation of FIGS. 2, 3, and 15.

With reference to FIGS. 16-18, a part 178 (e.g., a spoiler for a vehicle) includes a first component 180 and a housing 182, sometimes referred to as a doghouse. The housing 182 is connected to and extends from the first component 180. The housing 182 is open-ended and defines a slot 184. Further, a second component 186 (e.g., of a vehicle) defines a third opening 188. The part 178 is to be joined to the second component 186 by the first example fastener assembly 100.

With reference to FIGS. 16-18, the first example fastener assembly 100 is mounted to the part 178. More specifically, the flange portion 110 is retained in the housing 182. The threaded portion 112 extends through the slot 184. In some instances, the threaded portion 112 may be directly connected to the first component 180 (e.g., threaded into, welded, adhered, cast, etc.) and the housing 182 omitted.

With reference to FIG. 16, the pivot nut assembly 106 is in the insertion-ready orientation 190. It should be appreciated that when the pivot nut assembly 106 is in the insertion-ready orientation 190, the pivot nut assembly 106 is narrower than the third opening 188. Thus, in operation, the pivot nut assembly 106 and the threaded portion 112 may freely pass through the third opening 188 when the pivot nut assembly 106 is in the insertion-ready orientation 190. In other words, when the pivot nut assembly 106 is in the insertion-ready orientation 190, the pivot nut assembly 106 and the threaded portion 112 are ready to be inserted through the second component 186 via the third opening 188.

With reference to FIG. 17, the pivot nut assembly 106 is in the torque-ready orientation 192. It should be appreciated that when the pivot nut assembly 106 is in the torque-ready orientation 192, the pivot nut assembly 106 is wider than the third opening 188. More specifically, the flange portion 122 is deployed to span and overlap the third opening 188. Further, the pivot body 116 is upstream of the nut 118 along the threaded portion 112. Thus, in operation, the second component 186 may be captured between the pivot nut assembly 106 and the part 178 on the threaded portion 112 when the pivot nut assembly 106 is in the torque-ready orientation 192. Additionally, in operation, when the pivot nut assembly 106 is in the torque-ready orientation 192, the pivot nut assembly 106 is ready for an operator to apply torque to the nut 118 via the drive portion 162.

With reference to FIG. 18, further in operation, when the operator applies torque to the nut 118 via the drive portion 162, the pivot nut assembly 106 threadably advances along the threaded portion 112 to approach and contact the top side 132 of the flange portion 122 to the second component 186. As the pivot nut assembly 106 is further threadably advanced along the threaded portion 112, the flange portion 122 tightens against the second component 186 and the receiver portion 124 extends through the third opening 188. Thus, the second component 186 may be compressed between the flange portion 122 and the part 178 to secure the part 178 to the second component 186.

Figure 19:
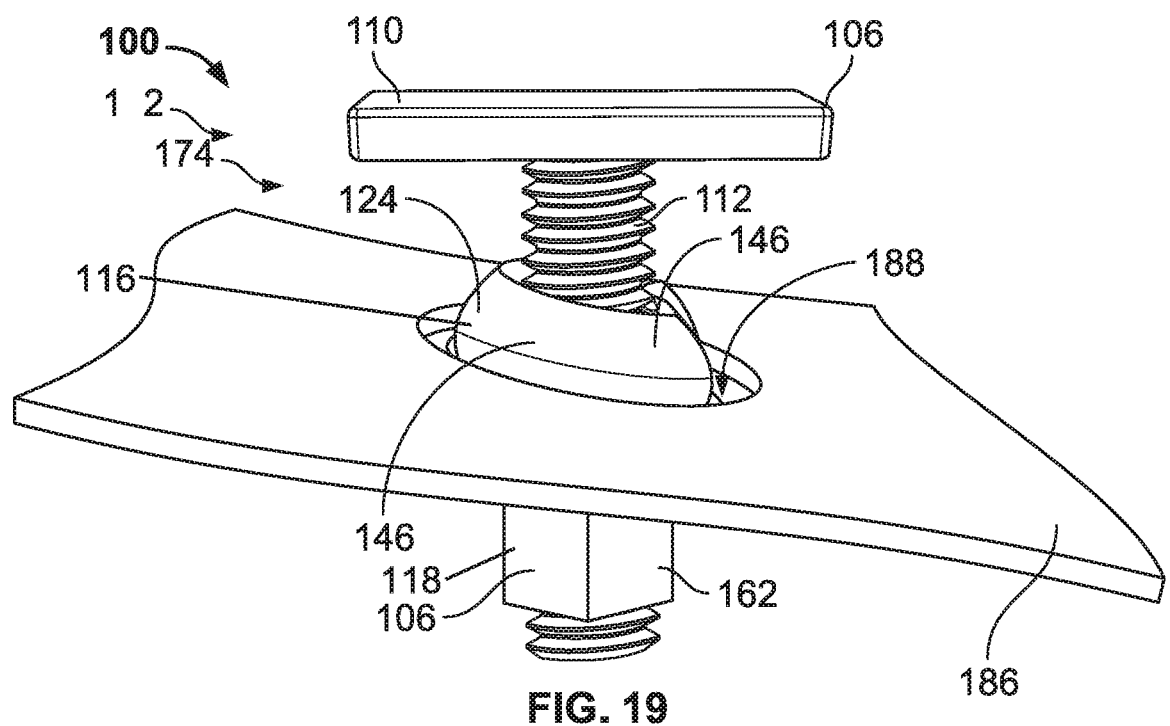
FIG. 19 is an isometric view of the first example fastener assembly of FIGS. 1-3 and 16-18 with the pivot nut assembly of FIGS. 1-3 and 12-18 tightened against the second component of FIGS. 16-18 at an oblique angle.
Figure 20:
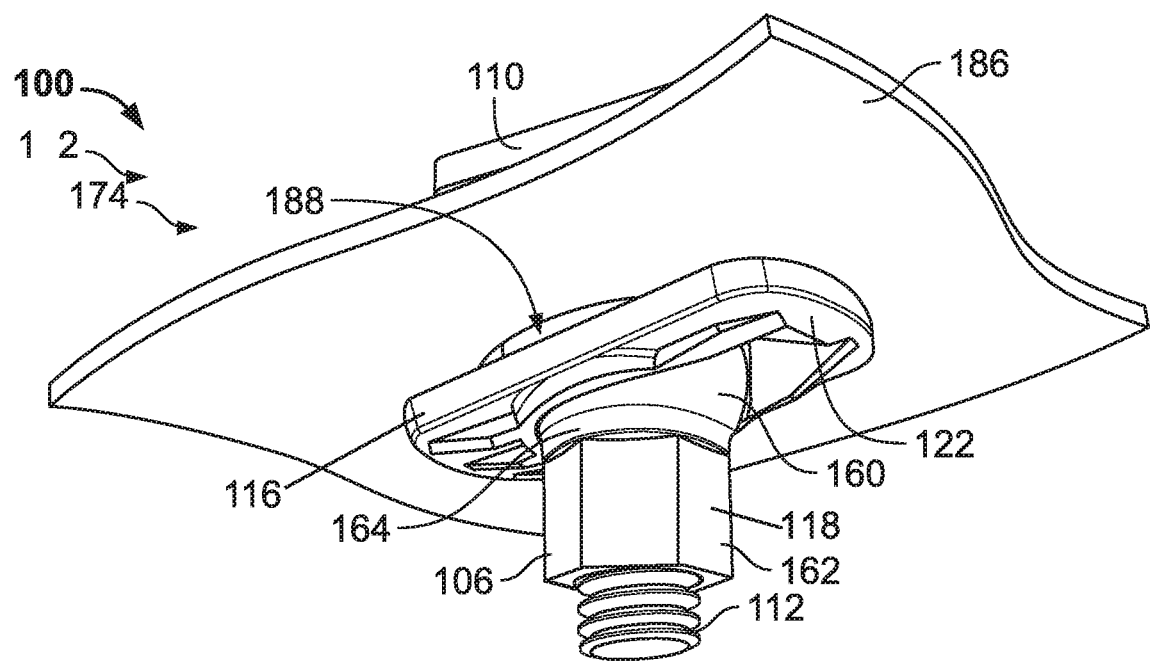
FIG. 20 is another isometric view of the first example fastener assembly of FIGS. 1-3 and 16-19 with the pivot nut assembly of FIGS. 1-3 and 12-19 tightened against the second component of FIGS. 16-19 at the oblique angle of FIG. 19.

With reference to FIGS. 19 and 20, in some instances, the second component 186 may be at an oblique angle relative to the threaded portion 112. With reference to FIG. 20, it should be appreciated that because the nut 118 is free to pivot and rotate relative to the pivot body 116, the flange portion 122 may align with the second component 186 at the oblique angle. Thus, the flange portion 122 may be tightened against the second component 186 at the oblique angle in the same manner as described above with reference to FIG. 18.

Figure 21:
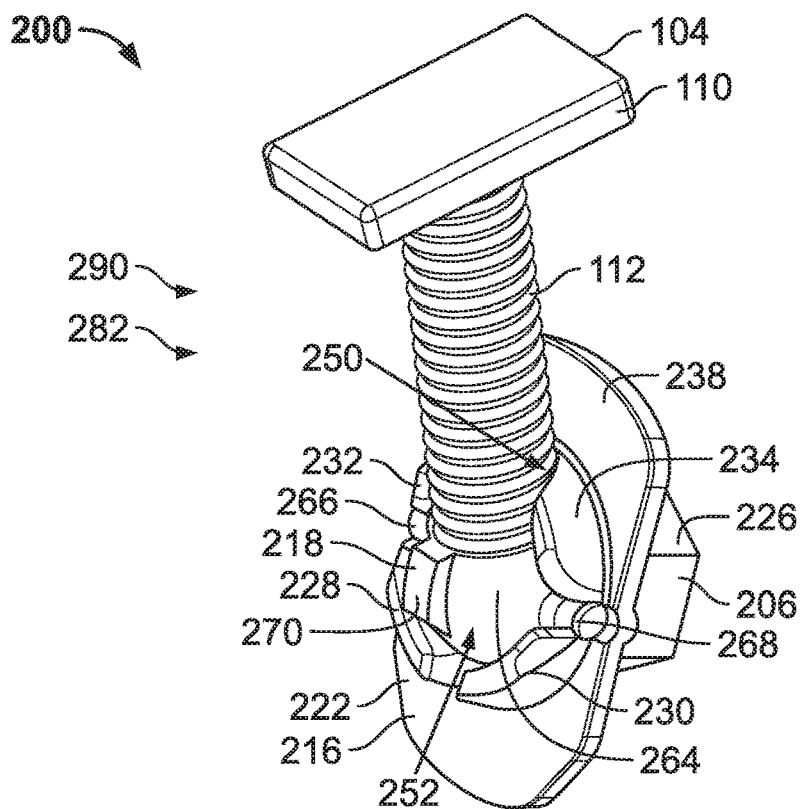
FIG. 21 is an isometric view of a second example fastener assembly according to an embodiment of the present disclosure with a pivot nut assembly of the second example fastener assembly in an insertion-ready orientation.
Figure 22:
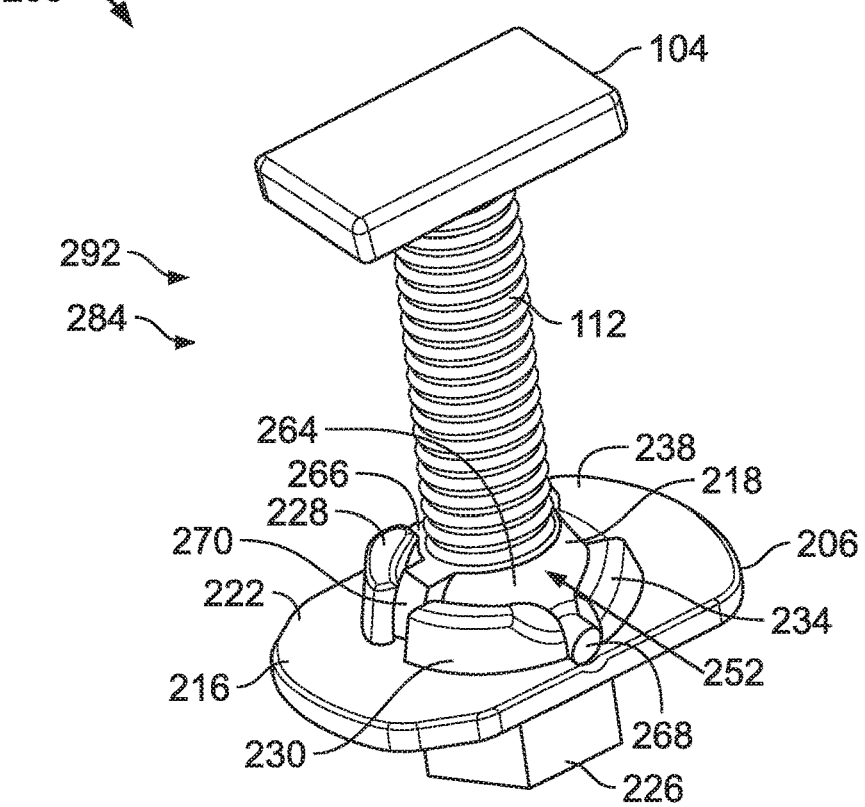
FIG. 22 is an isometric view of the second example fastener assembly of FIG. 21 with the pivot nut assembly in a torque-ready orientation.
Figure 23:
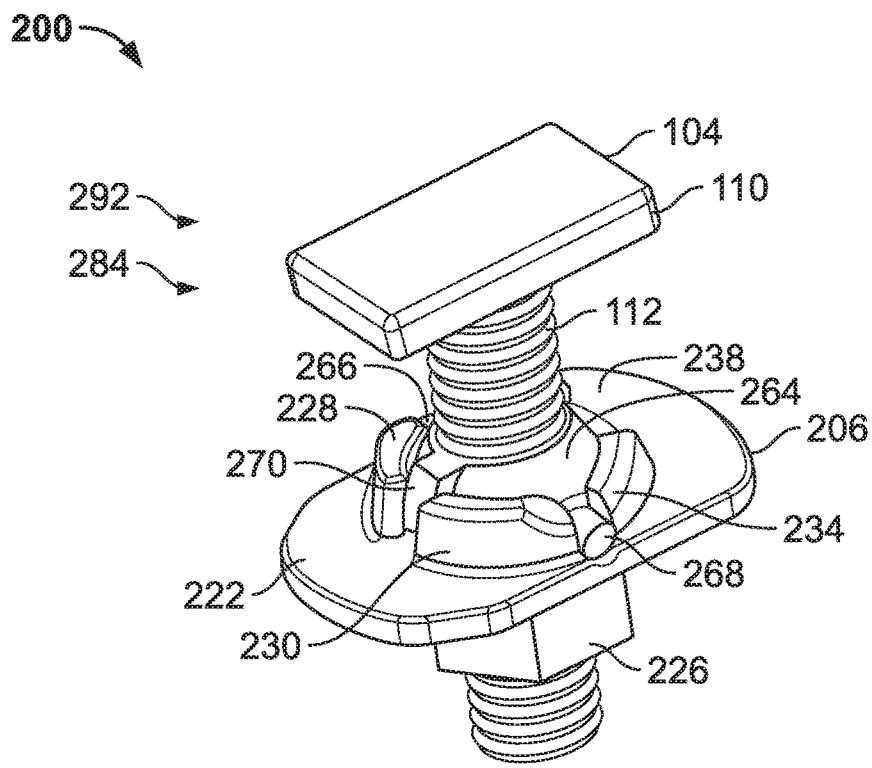
FIG. 23 is an isometric view of the second example fastener assembly of FIGS. 21 and 22 with the pivot nut assembly in the torque-ready orientation of FIG. 22 and advanced along a bolt of the first example fastener assembly.
Figure 24:
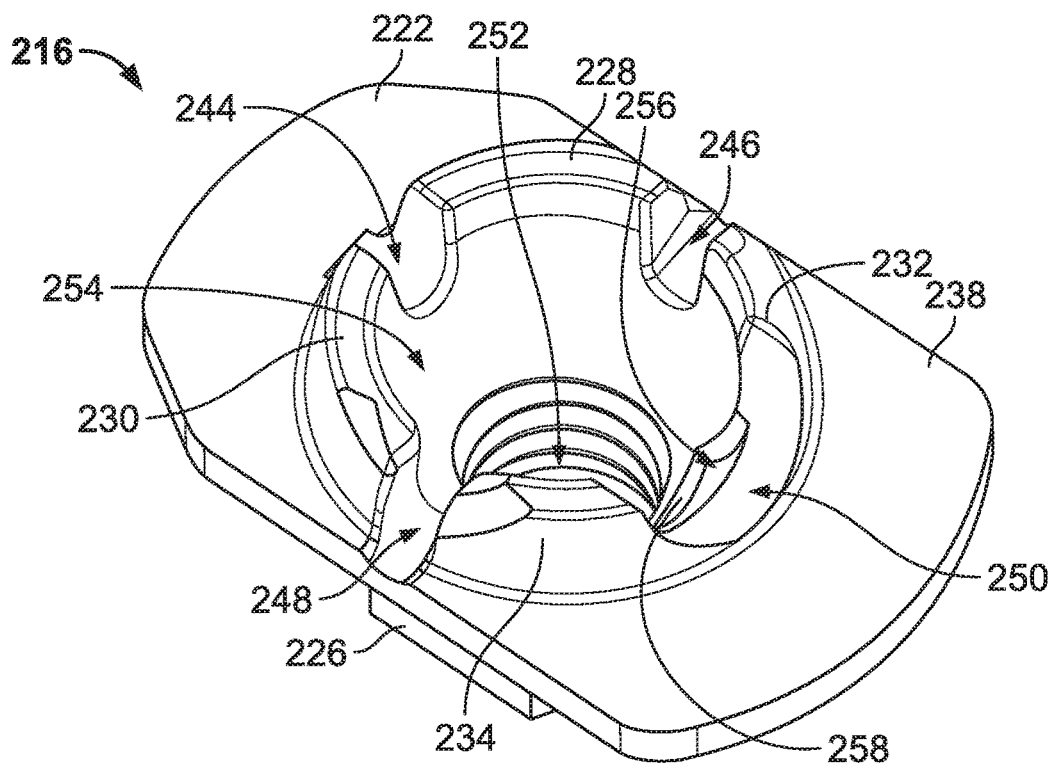
FIG. 24 is an isometric view of a pivot body of the pivot nut assembly of FIGS. 21-23.

A second example fastener assembly 200 according to another embodiment of the present disclosure is depicted in FIGS. 21-23 and 36-38. With reference to FIGS. 21-23, the second example fastener assembly 200 includes the bolt 104 and pivot nut assembly 206. The pivot nut assembly 206 threadably engages the bolt 104, as will be explained in greater detail below.

With reference to FIGS. 21-23, the pivot nut assembly 106 includes a pivot body 216 and a nut 218. The nut 218 is pivotably and rotatably engaged with the pivot body 216. The nut 218 is snapably engaged with and retained in the pivot body 116. In some embodiments, the pivot body 216 is formed of polymer plastic. In some embodiments, the pivot body 216 is metallic. In some embodiments, the nut 218 is formed of polymer plastic. In some embodiments, the nut 218 is metallic.

Figure 25:
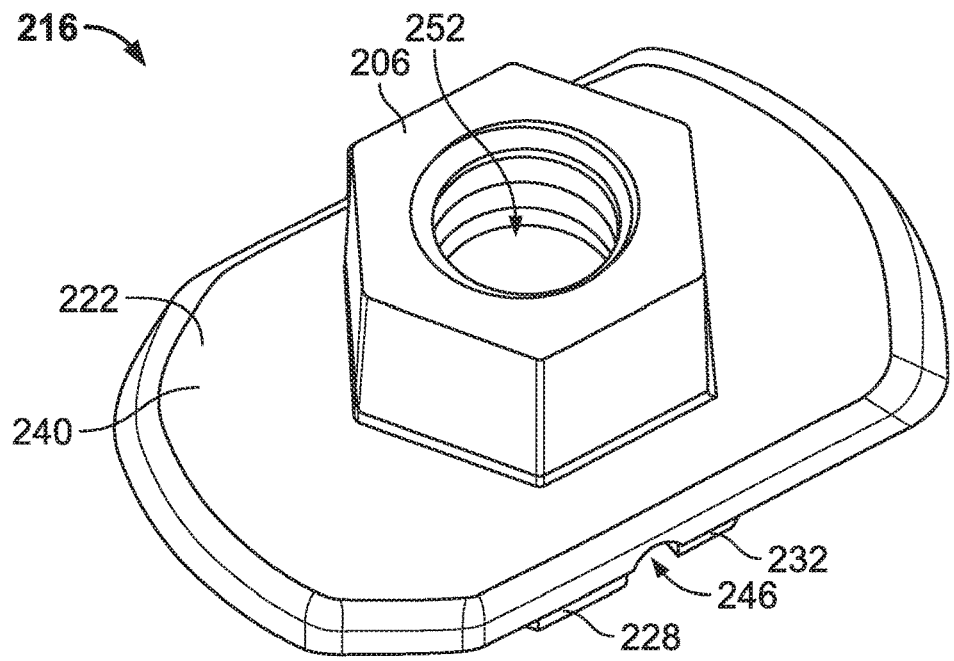
FIG. 25 is another isometric view of the pivot body of FIG. 24.
Figure 26:
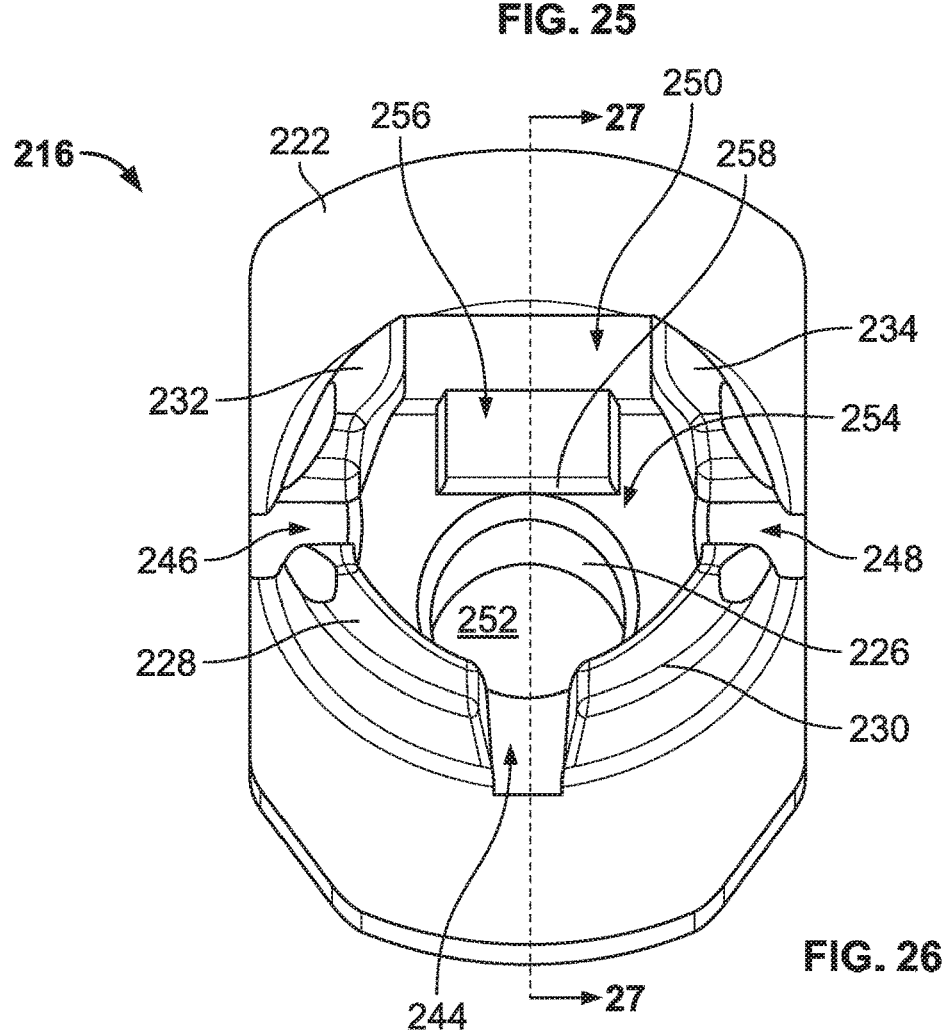
FIG. 26 is yet another isometric view of the pivot body of FIGS. 24 and 25.
Figure 27:
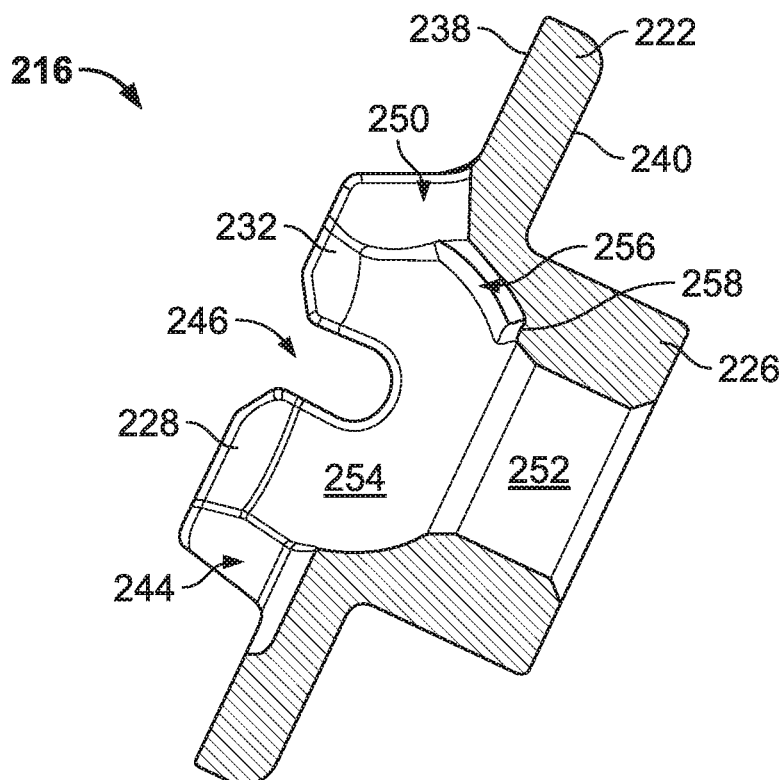
FIG. 27 is a cross-sectional view of the pivot body of FIGS. 24-26 taken along line 27-27 of FIG. 26.

With reference to FIGS. 21-27, the pivot body 216 includes a flange portion 222, a drive portion 226, a first pivot extension 228, a second pivot extension 230, a third pivot extension 232, and a fourth pivot extension 234. With reference to FIG. 27, the pivot body 216 also includes a top side 238 and a bottom side 240.

With reference to FIG. 25, the drive portion 226 is connected to and extends from the flange portion 222 at the bottom side 240. The drive portion 226 is non-circular (e.g., rectilinear, hexagonal, ovate, etc.) to correspond with a torque-applying tool (e.g., a wrench and/or a screwdriver) (not shown). In the illustrated example, the drive portion 226 is depicted as hexagonal. In some embodiments, the drive portion 226 is internally threaded. With reference to FIG. 38, in some embodiments, the bolt 104 taps (e.g., cuts internal threads into) the drive portion 226 as the pivot nut assembly 206 is advanced along the threaded portion 112.

With reference to FIG. 26, the first pivot extension 228, the second pivot extension 230, the third pivot extension 232, and the fourth pivot extension 234 are connected to and extend from the flange portion 222 at the top side 238. The first pivot extension 228 and the second pivot extension 230 are mirror images of one another. Additionally, the third pivot extension 232 and the fourth pivot extension 234 are mirror images of one another.

With reference to FIG. 26, the pivot body 216 defines a torque slot 244, a first pivot slot 246, a second pivot slot 248, a channel 250, a first opening 252, a first pocket 254, and a second pocket 256. With reference to FIGS. 26 and 27, the drive portion 226 includes a shoulder 258.

With reference to FIG. 26, the first pivot extension 228, the second pivot extension 230, and the flange portion 222 define the torque slot 244. The torque slot 244 is between the first pivot extension 228 and the second pivot extension 230.

With reference to FIG. 26, the first pivot extension 228, the third pivot extension 232, and the flange portion 222 define the first pivot slot 246. The first pivot slot 246 is between the first pivot extension 228 and the third pivot extension 232.

With reference to FIG. 26, the second pivot extension 230, the fourth pivot extension 234, and the flange portion 222 define the second pivot slot 248. The second pivot slot 248 is between the second pivot extension 230 and the fourth pivot extension 234.

With reference to FIG. 26, the third pivot extension 232, the fourth pivot extension 234, and flange portion 222 define the channel 250. The channel 250 is between the third pivot extension 232 and the fourth pivot extension 234. The channel 250 is shaped to accommodate the threaded portion 112, as shown in FIG. 21.

With reference to FIG. 26, the drive portion 226 defines the first opening 252. The first pivot extension 228, the second pivot extension 230, the third pivot extension 232, the fourth pivot extension 234, the flange portion 222, and the drive portion 226 collectively define the first pocket 254. The first pocket 254 is generally internally spherical. Further, the third pivot extension 232, the fourth pivot extension 234, the flange portion 222, and the drive portion 226 collectively define the second pocket 256. More specifically, the shoulder 258 partially defines the second pocket 256.

With reference to FIG. 26, the torque slot 244 is opposite the channel 250. The first pivot slot 246 is opposite the second pivot slot 248. The torque slot 244, the channel 250, the first pivot slot 246, and the second pivot slot 248 are in communication with the first pocket 254. Further, the channel 250 is in direct communication with the first pocket 254 and the second pocket 256. The first opening 252 is in communication with the first pocket 254.

Figure 28:
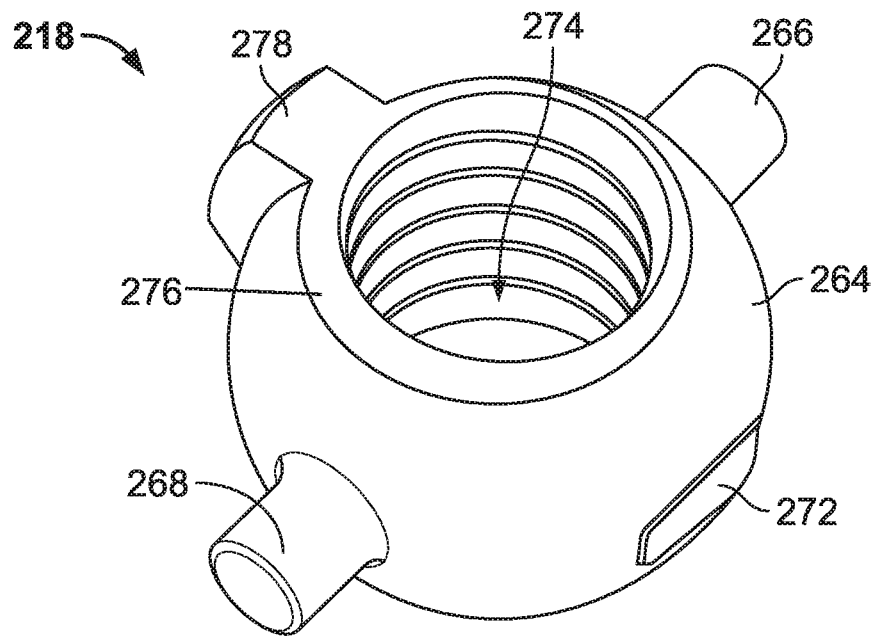
FIG. 28 is an isometric view of a nut of the pivot nut assembly of FIGS. 21-23.
Figure 29:
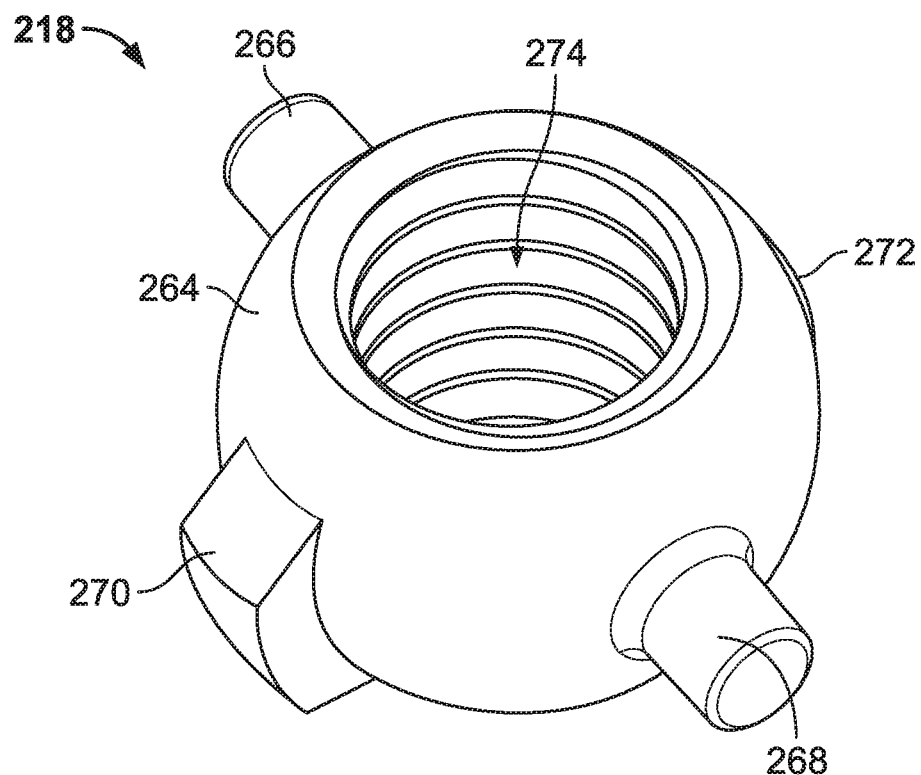
FIG. 29 another isometric view of the nut of FIG. 28.

With reference to FIGS. 28 and 29, the nut 218 includes a pivot portion 264, a first pivot axle 266, a second pivot axle 268, a torque tab 270, and a locking bump 272. The nut 218 defines a second opening 274. In some embodiments, the nut 218 is internally threaded. With reference to FIG. 38, in some embodiments, the bolt 104 taps (e.g., cuts internal threads into) the nut 218 as the pivot nut assembly 206 is advanced along the threaded portion 112.

With reference to FIGS. 28 and 29, the first pivot axle 266, the second pivot axle 268, the torque tab 270, and the locking bump 272 extend from the pivot portion 264. The first pivot axle 266 is opposite the second pivot axle 268. The torque tab 270 is opposite the locking bump 272.

With reference to FIGS. 28 and 29, the first pivot axle 266 and the second pivot axle 268 are generally cylindrical. Thus, the first pivot axle 266 is pivotably disposed in the first pivot slot 246, as shown in FIG. 26. Further, the second pivot axle 268 is pivotably disposed in the second pivot slot 248.

Figure 33:
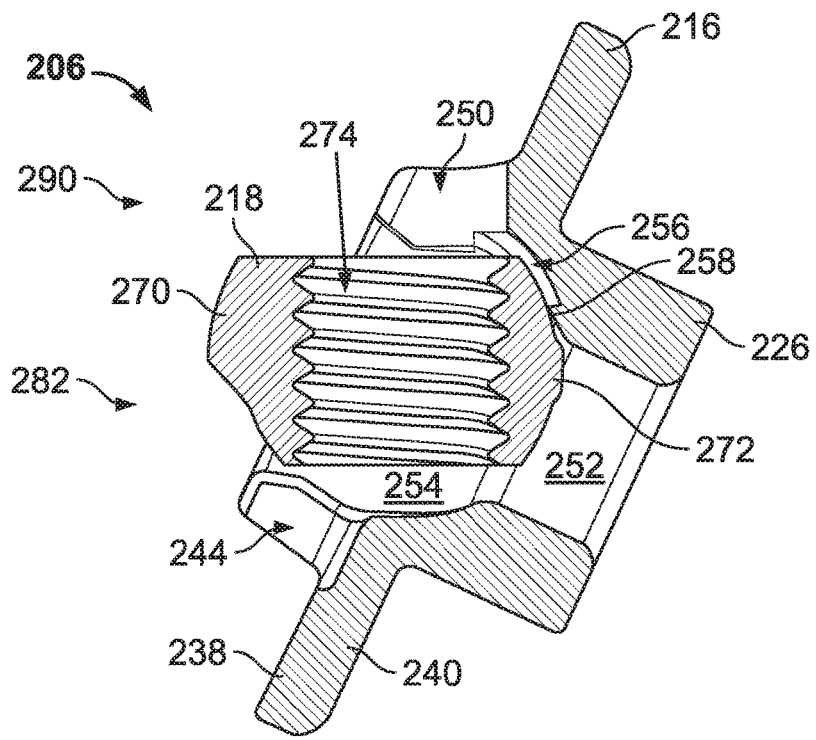
FIG. 33 is a cross-sectional view of the pivot nut assembly of FIGS. 21-23 and 32 taken along line 33-33 of FIG. 32.
Figure 34:
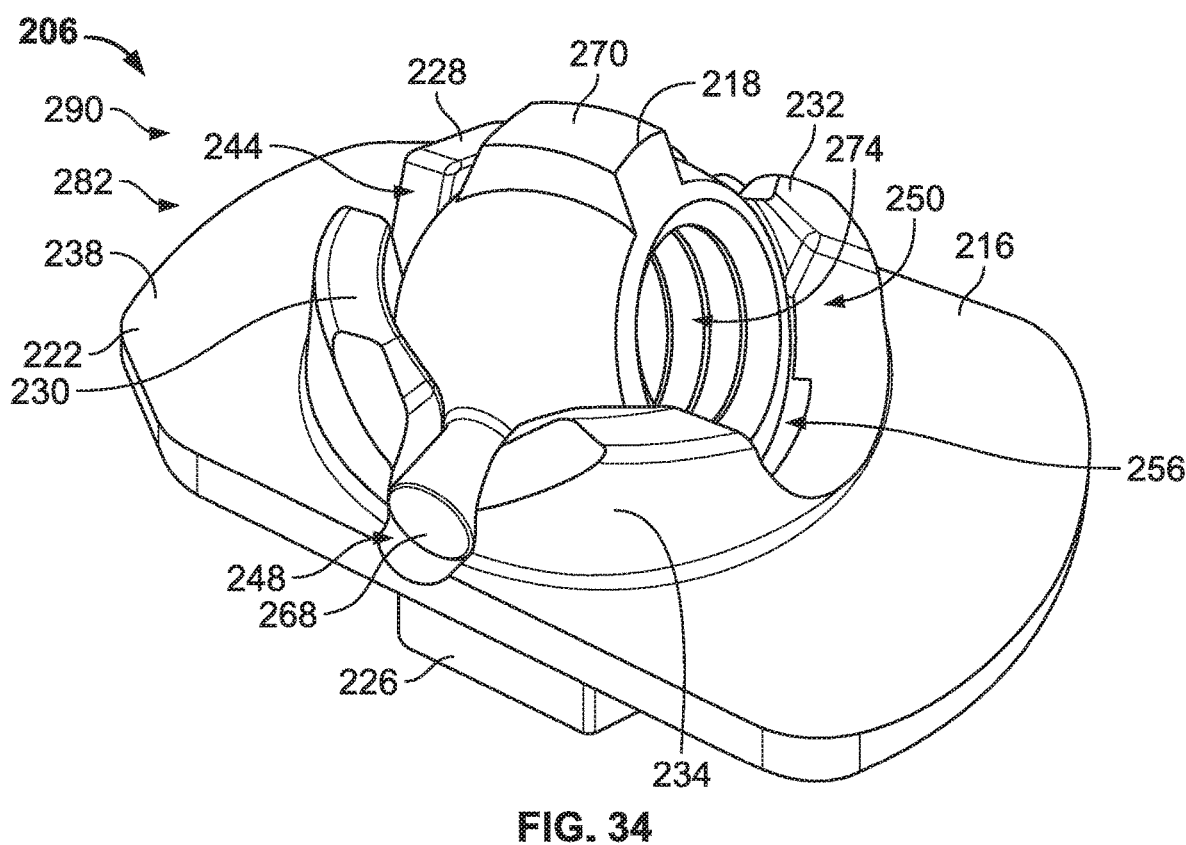
FIG. 34 is an isometric view of the pivot nut assembly of FIGS. 21-23, 32, and 33 in the insertion-ready orientation of FIGS. 21 and 22.

With reference to FIGS. 28 and 29, the pivot portion 264 is partially spherical. Thus, the pivot portion 264 is pivotably disposed in the first pocket 254, as shown in FIG. 33. In some embodiments, the pivot portion 264 is cylindrical. Thus, in some embodiments, first pocket 254 is generally internally cylindrical.

Figure 30:
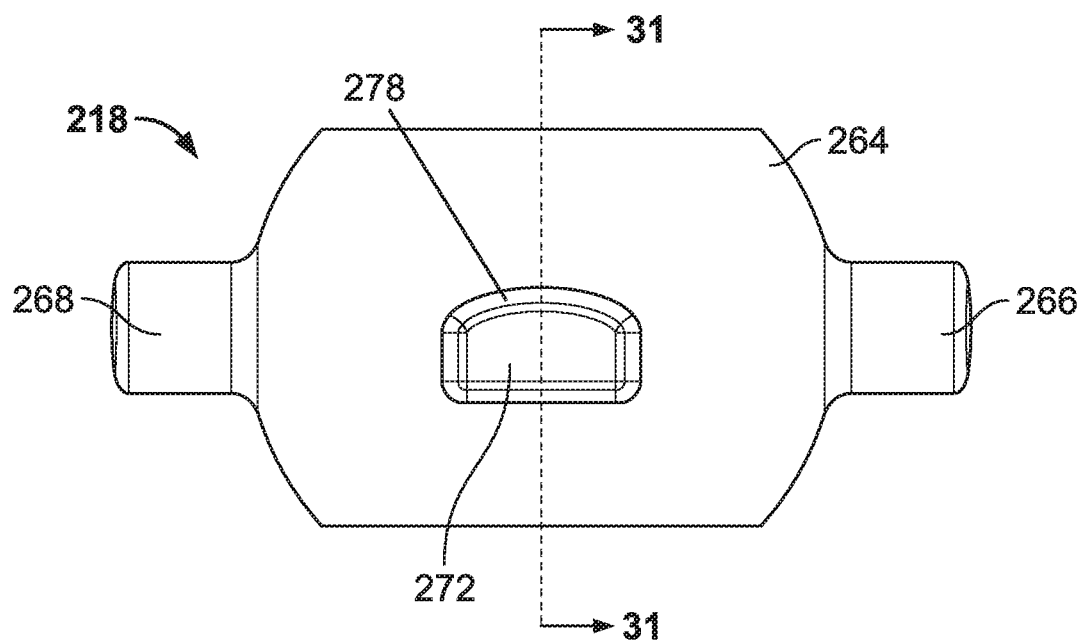
FIG. 30 is a side view of the nut of FIGS. 28 and 29.
Figure 31:
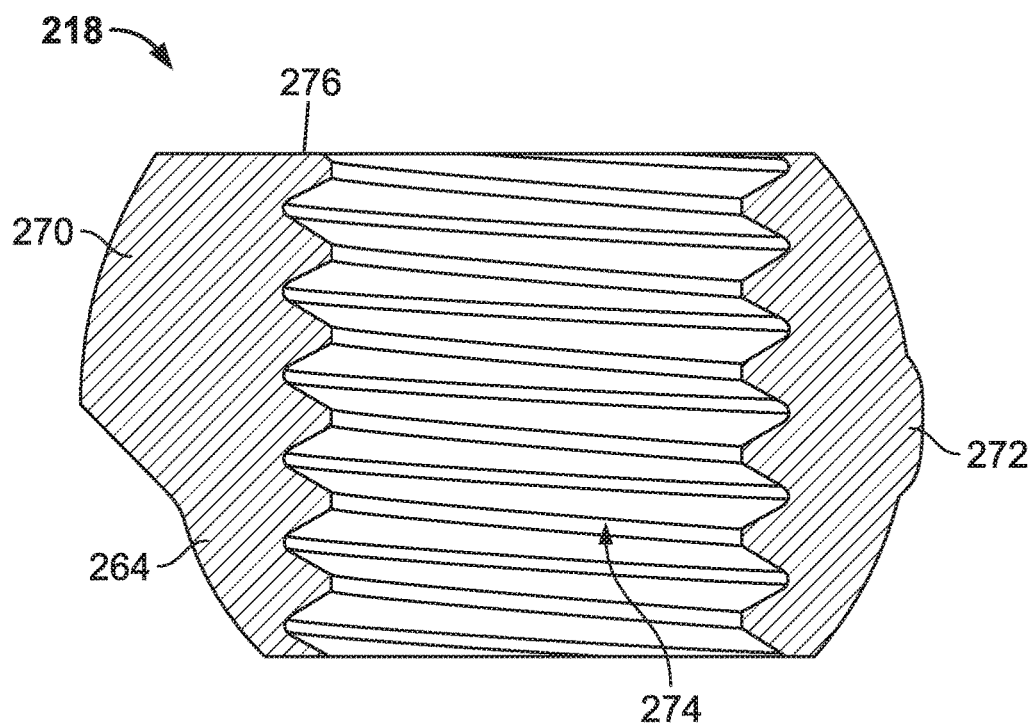
FIG. 31 is a cross-sectional view of the nut of FIGS. 28-30 taken along line 31-31 of FIG. 30.

With reference to FIGS. 28 and 30, the torque tab 270 is generally trapezoidal and is aligned with a top side 276 of the nut 218. With reference to FIGS. 30 and 31, the locking bump 272 includes a lead-in feature 278. In some embodiments, the lead-in feature 278 is shaped as an arcuate ramp.

Figure 32:
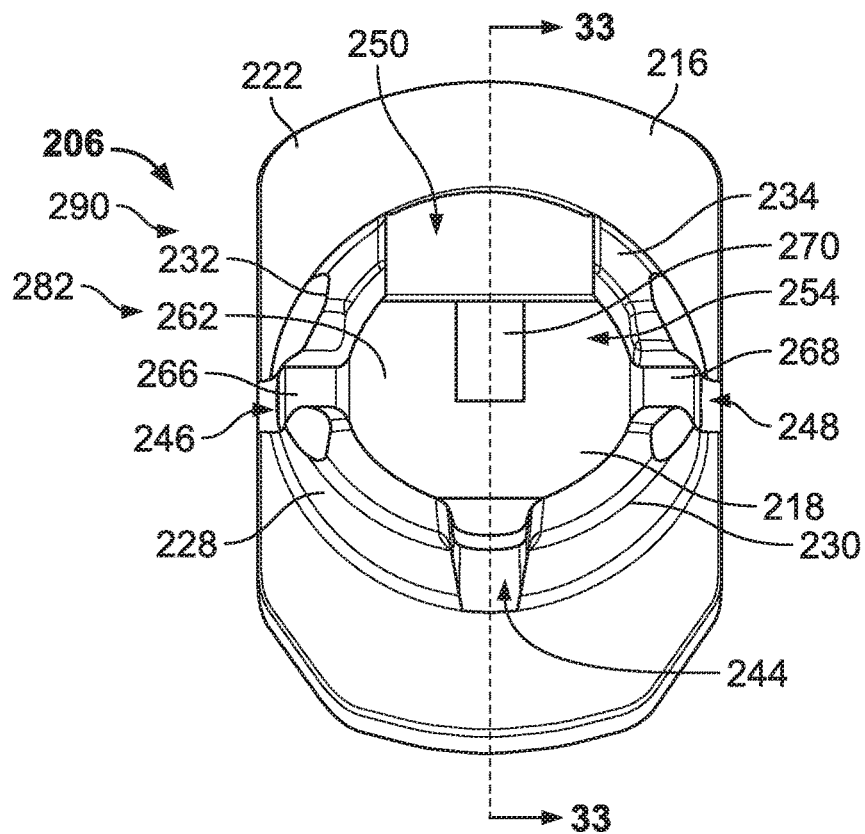
FIG. 32 is a side view of the pivot nut assembly of FIGS. 21-23.

With reference to FIGS. 32-35, the pivot body 216 receives the nut 218. In other words, the nut 218 is pivotably and rotatably engaged in the pivot body 216 via the first pocket 254. With reference to FIG. 32, more specifically, the pivot portion 264 pivotably engages the first pivot extension 228, the second pivot extension 230, the third pivot extension 232, the fourth pivot extension 234, the flange portion 222, and the drive portion 226.

With reference to FIG. 32, the first pivot axle 266 pivotably engages the first pivot extension 228 and the third pivot extension 232. Thus, the first pivot axle 266 is pivotably disposed in the pivot body 216 via the first pivot slot 246.

With reference to FIG. 32, the second pivot axle 268 pivotably engages the second pivot extension 230 and the fourth pivot extension 234. Thus, the second pivot axle 268 is pivotably disposed in the pivot body 216 via the second pivot slot 248.

With reference to FIG. 32, the torque tab 270 slidably engages the first pivot extension 228 and the second pivot extension 230. Thus, the torque tab 270 slidably fits into pivot body 216 via the torque slot 244.

With reference to FIG. 33, the locking bump 272 slidably engages the shoulder 258, the drive portion 226, and the flange portion 222. Thus, the locking bump 272 slidably fits into the pivot body 216 the second pocket 256.

With reference to FIG. 32, when the pivot nut assembly 206 is assembled, the first pivot axle 266 is interferingly pushed between the first pivot extension 228 and the third pivot extension 232 into the first pivot slot 246. Additionally, when the pivot nut assembly 206 is assembled, the second pivot axle 268 is interferingly pushed between the second pivot extension 230 and the fourth pivot extension 234 into the second pivot slot 248. Thus, the nut 218 is pivotably moveable relative to the pivot body 216 between a first position 282 (shown in FIGS. 32-34) and a second position 284 (shown in FIG. 35). In other words, with reference to FIG. 36, when the nut 218 is in the first position 282, the pivot nut assembly 206 is in an insertion-ready orientation 290. Additionally, with reference to FIGS. 37 and 38, when the nut 218 is in the second position 284, the pivot nut assembly 206 is in a torque-ready orientation 292.

With reference to FIG. 33, when the nut 218 is in the first position 282, the locking bump 272 abuttingly engages the shoulder 258 in the first pocket 254. Thus, the shoulder 258 pivotably retains the nut 218 in the first position 282. Put differently, the shoulder 258 and the locking bump 272 selectively engage to retain the nut 218 in the first position 282 relative to the pivot body 216. Additionally, when the nut 218 is in the first position 282, the second opening 274 is misaligned with the first opening 252.

Figure 35:
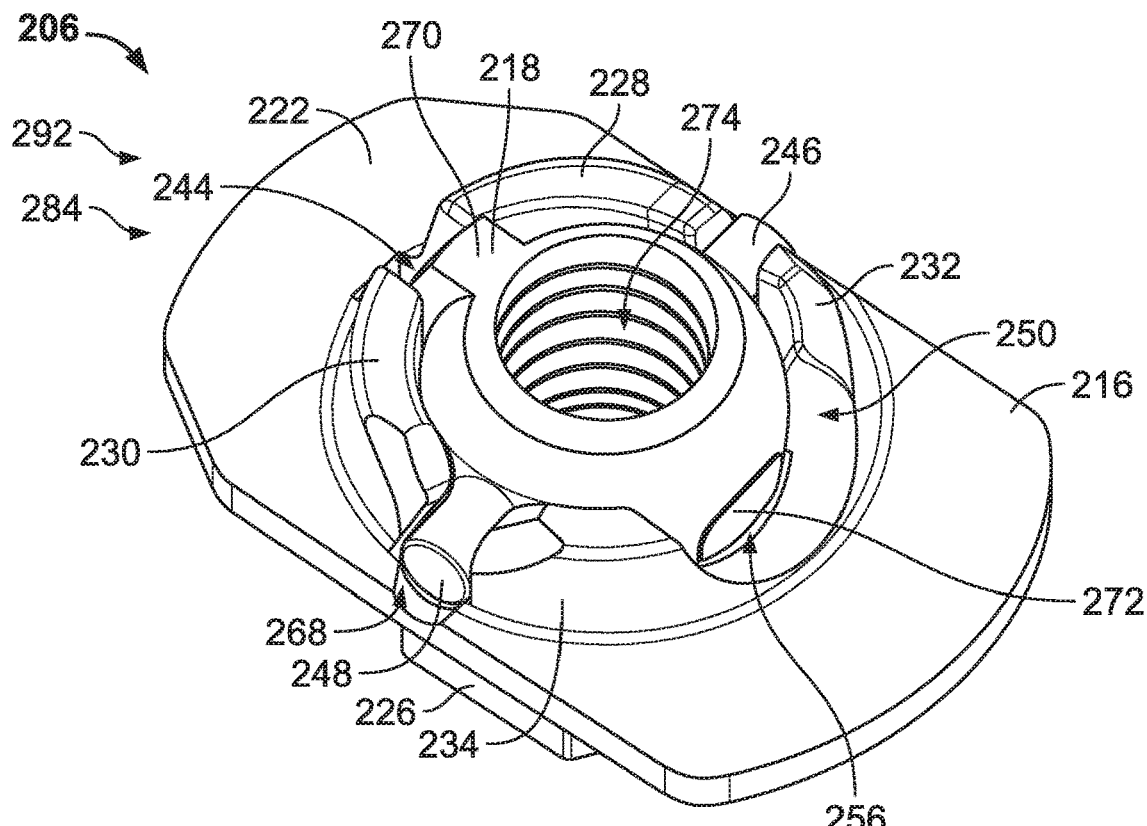
FIG. 35 is an isometric view of the pivot nut assembly of FIGS. 21-23 and 32-34 in the torque-ready orientation of FIG. 23.

With reference to FIG. 35, when the nut 218 is in the second position 284, the locking bump 272 is disposed in the second pocket 256. In operation, with reference to FIG. 33, the locking bump 272 snaps past the shoulder 258 to move the nut 218 from the first position 282 to the second position 284 (shown in FIG. 35). Further, in operation, the locking bump 272 snaps past the shoulder 258 to move the nut 218 from the second position 284 (shown in FIG. 35) to the first position 282. Additionally, when the nut 218 is in the second position 284, the second opening 274 is in communication and aligned with the first opening 252, as shown in FIG. 37.

With reference to FIGS. 21-23 and 36-38, the pivot nut assembly 206 threadably engages the bolt 104 via the nut 218 and/or the pivot body 216. More specifically, with reference to FIGS. 36-38, the threaded portion 112 extends into the second opening 274 to threadably engage the nut 118. With reference to FIG. 38, when the pivot nut assembly 206 is in the torque-ready orientation 294, the threaded portion 112 is aligned with the first opening 252. With reference to FIG. 38, as the pivot nut assembly 206 threadably advances along the threaded portion 112, the threaded portion 112 extends through the second opening 274 and the first opening 252 to threadably engage the nut 218 and the pivot body 216.

Figure 36:
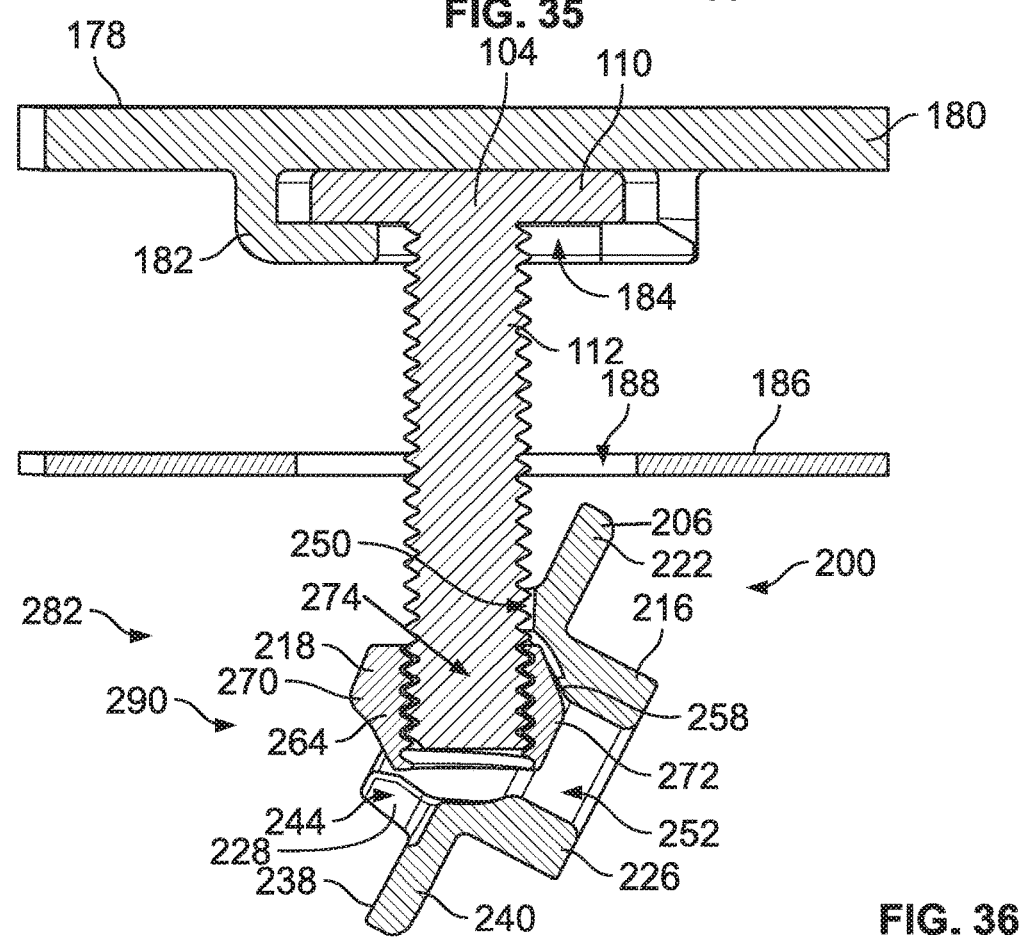
FIG. 36 is a cross-sectional view of the second example fastener assembly of FIGS. 21-23 mounted to the first component of FIGS. 16-18 and inserted through the second component of FIGS. 16-20 with the pivot nut assembly of FIGS. 21-23 and 32-35 in the insertion-ready orientation of FIGS. 21 and 34.
Figure 37:
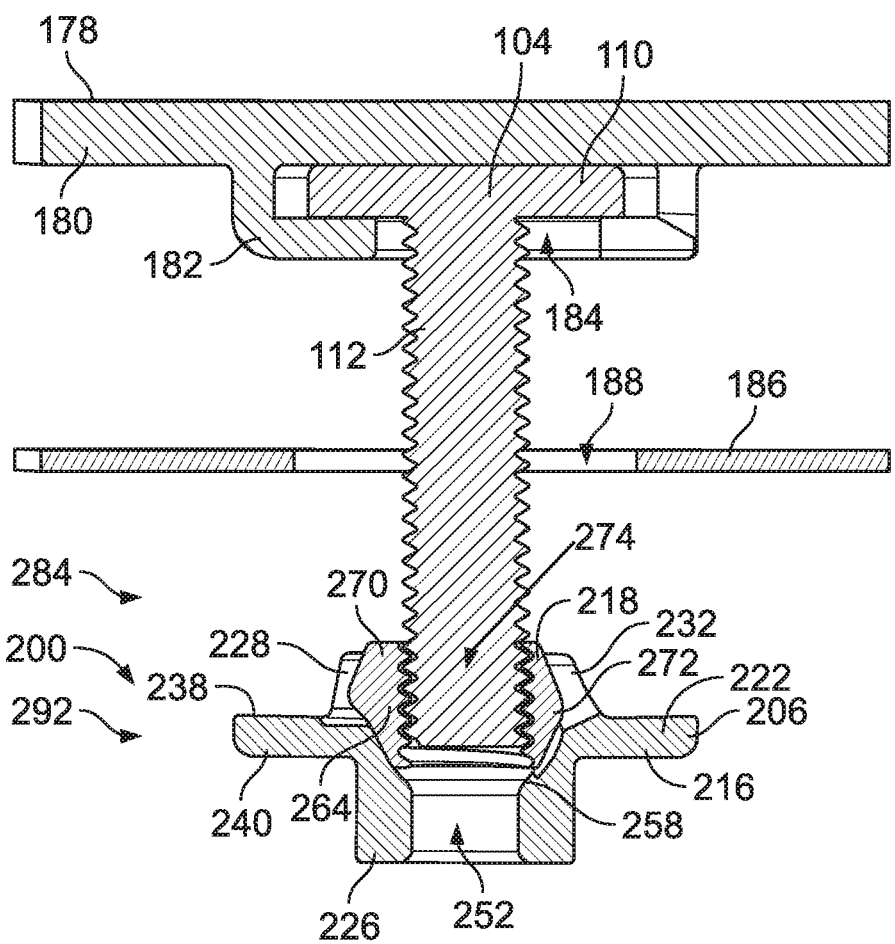
FIG. 37 is a cross-sectional view of the second example fastener assembly of FIGS. 21-23 and 36 mounted to the first component of FIGS. 16-18 and 36 and inserted through the second component of FIGS. 16-20 and 36 with the pivot nut assembly of FIGS. 21-23 and 32-36 in the torque-ready orientation of FIGS. 22, 23, and 35.

With reference to FIGS. 36-38, the second example fastener assembly 200 is mounted to the part 178. More specifically, the flange portion 110 is retained in the housing 182. The threaded portion 112 extends through the slot 184. In some instances, the threaded portion 112 may be directly connected to the first component 180 (e.g., threaded into, welded, adhered, cast, etc.) and the housing 182 omitted.

With reference to FIG. 36, the pivot nut assembly 206 is in the insertion-ready orientation 290. It should be appreciated that when the pivot nut assembly 206 is in the insertion-ready orientation 290, the pivot nut assembly 206 is narrower than the third opening 188. Thus, in operation, the pivot nut assembly 206 and the threaded portion 112 may freely pass through the third opening 188 when the pivot nut assembly 206 is in the insertion-ready orientation 290. In other words, when the pivot nut assembly 206 is in the insertion-ready orientation 290, the pivot nut assembly 206 and the threaded portion 112 are ready to be inserted through the second component 186 via the third opening 188.

With reference to FIG. 37, the pivot nut assembly 206 is in the torque-ready orientation 292. It should be appreciated that when the pivot nut assembly 206 is in the torque-ready orientation 292, the pivot nut assembly 206 is wider than the third opening 188. More specifically, the flange portion 222 is deployed to span and overlap the third opening 188. Further, the nut 218 is upstream of the pivot body 216 along the threaded portion 112. Thus, in operation, the second component 186 may be captured between the pivot nut assembly 206 and the part 178 on the threaded portion 112 when the pivot nut assembly 206 is in the torque-ready orientation 292. Additionally, in operation, when the pivot nut assembly 206 is in the torque-ready orientation 292, the pivot nut assembly 206 is ready for an operator to apply torque to the drive portion 162.

With reference to FIG. 18, further in operation, when the operator applies torque to the drive portion 162, the pivot nut assembly 206 threadably advances along the threaded portion 112 to approach and contact the top side 238 of the flange portion 222 to the second component 186. More specifically, the torque is transmitted by the first pivot extension 228, the second pivot extension 230, the third pivot extension 232, and the fourth pivot extension 234 to the nut 218 via the first pivot axle 266, the second pivot axle 268, and the torque tab 270. It should be appreciated that the torque tab 270 is a supplementary aid to the torque transmission relative to the first pivot axle 266 and the second pivot axle 268. Thus, the torque tab 270 may be omitted in some embodiments. Additionally, in some embodiments, the nut 218 may include a plurality of torque tabs 270. Thus, in some embodiments, the pivot body 216 defines a plurality of torque slots 244. As the pivot nut assembly 206 is further threadably advanced along the threaded portion 112, the flange portion 222 tightens against the second component 186. Additionally, as the flange portion 222 tightens against the second component 186, the first pivot extension 228, the second pivot extension 230, the third pivot extension 232, the fourth pivot extension 234, and the nut 218 extend through the third opening 188. Thus, the second component 186 may be compressed between the flange portion 122 and the part 178 to secure the part 178 to the second component 186.

Embodiments of the present disclosure provide a fastener system with features that are configured to facilitate operators in mounting, assembling, and tightening the fastener system to secure components (e.g., panels) together. The fastener system assembly includes a bolt and a pivot nut assembly that threadably engage with one another. The pivot nut assembly is moveable between an insertion-ready orientation and a torque-ready orientation. In the insertion-ready orientation, the pivot nut assembly and the bolt extend freely through an opening in a component. In the torque-ready orientation, a flange portion of the pivot nut assembly is deployed to engage and secure the component.

From the foregoing, it will be appreciated that the above first example fastener assembly 100 and the above second example fastener assembly 200 each includes a pivot body 116, 216 that pivotably deploys relative to a nut 118, 218 from an insertion-ready orientation 190, 290 to a torque-ready orientation 192, 292. In the insertion-ready orientation 190, 290, the pivot body 116, 216 passes freely through an appropriately-sized opening in a component. In the torque-ready orientation 192, 292, the pivot body 116, 216 overlaps the opening to engage the component. Because the pivot body 116, 216 may pass freely through the opening, the first and second example fastener assemblies 100, 200 may be easier for an operator to assemble, which may prevent assembly line stoppages, reduce scrap due to misassembly, and/or improve manufacturing efficiency. Thus, the above-disclosed first and second example fastener assemblies 100, 200 conserves resources and may improve manufacturing efficiency as compared to existing fasteners.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A pivot nut assembly, comprising:
a pivot body including a guide lip; and
a nut pivotably engaged in the pivot body,
wherein the nut is rotatably engaged in the pivot body,
wherein the pivot body has a first shoulder,
the nut has a second shoulder,
wherein the guide lip is configured to retain the nut to the pivot body, and
the second shoulder selectively engages the first shoulder to retain the nut in a first position relative to the pivot body.

2. The pivot nut assembly of claim 1, wherein the pivot body defines a pocket and the nut is disposed in the pocket.

3. The pivot nut assembly of claim 1, wherein:
the pivot body defines an oblong opening.

4. The pivot nut assembly of claim 1, wherein the nut is partially spherical.

5. The pivot nut assembly of claim 1, wherein the pivot body includes a partially spherical socket wall.

6. The pivot nut assembly of claim 1, wherein the pivot body defines a pocket to accommodate a bolt.

7. The pivot nut assembly of claim 1, wherein the pivot body includes a flange portion.

8. The pivot nut assembly of claim 1, wherein the nut is moveable between the first position and a second position relative to the pivot body.

9. The pivot nut assembly of claim 1, wherein the pivot body defines a pocket to accommodate a drive portion of the nut.

10. A fastener nut assembly, comprising:
a bolt including a threaded portion;
a pivot nut assembly having a pivot body having at least one nest surface shaped as a flat ramp and a nut having a semi-spherical portion; and
wherein the pivot nut assembly is threadably engaged with the threaded portion in an insertion-ready orientation, the pivot nut assembly being moveable between the insertion-ready orientation and a torque-ready orientation,
the at least one nest surface engages with the nut in the insertion-ready orientation, and
wherein the nut is rotatably engaged in the pivot body.

11. The fastener nut assembly of claim 10, wherein:
when the pivot nut assembly is in the insertion-ready orientation, the pivot nut assembly and the threaded portion pass freely through an opening defined in a component, and
when the pivot nut assembly is in the torque-ready orientation, the pivot nut assembly overlaps the opening to engage the component.

12. The fastener nut assembly of claim 10, wherein the pivot nut assembly is moveable to engage a component disposed at an oblique angle relative to the threaded portion.

13. A vehicle part, comprising:
a first component;
a threaded portion connected to the first component;
a second component with an opening configured to be secured to the first component and
a pivot nut assembly having a pivot body having a semi-spherical surface and a nut;
wherein the pivot nut assembly is threadably engaged with the threaded portion in an insertion-ready orientation, and the pivot body is deployable between the insertion-ready orientation and a torque-ready orientation,
wherein when the pivot nut assembly is in the insertion-ready orientation the pivot body and the threaded portion can pass freely through the opening, and
wherein the nut is rotatably engaged in the semi-spherical surface.

14. The vehicle part of claim 13, wherein:
when the pivot body is in the torque-ready orientation, the pivot body overlaps the opening to engage the second component.

* * * * *